United States Patent
Beretich, Jr. et al.

(10) Patent No.: US 10,198,478 B2
(45) Date of Patent: *Feb. 5, 2019

(54) METHODS AND SYSTEMS FOR TECHNOLOGY ANALYSIS AND MAPPING

(71) Applicant: SPORE, INC., Durham, NC (US)

(72) Inventors: Guy R. Beretich, Jr., Durham, NC (US); JiNan Glasgow George, Durham, NC (US)

(73) Assignee: MAGIC NUMBER, INC., Durham, NC (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/338,745

(22) Filed: Oct. 31, 2016

(65) Prior Publication Data

US 2017/0046398 A1 Feb. 16, 2017

Related U.S. Application Data

(63) Continuation-in-part of application No. 15/241,578, filed on Aug. 19, 2016, now Pat. No. 9,922,383, which is a continuation-in-part of application No. 14/822,405, filed on Aug. 10, 2015, now Pat. No. 9,430,756, which is a continuation of application No. 12/633,917, filed on Dec. 9, 2009, now Pat. No. 9,104,648, which is a continuation of application No. 10/983,458, filed on Nov. 8, 2004, now Pat. No. 7,644,360, and a continuation-in-part of application No. 10/963,131, filed on Oct. 12, 2004, now Pat. No. 9,483,551.

(60) Provisional application No. 60/527,788, filed on Dec. 8, 2003, provisional application No. 60/518,119, filed on Nov. 7, 2003, provisional application No. 60/510,734, filed on Oct. 11, 2003.

(51) Int. Cl.
*G06F 17/30* (2006.01)

(52) U.S. Cl.
CPC .. *G06F 17/30528* (2013.01); *G06F 17/30554* (2013.01); *G06F 17/30696* (2013.01)

(58) Field of Classification Search
CPC ......... G06F 17/30528; G06F 17/30554; G06F 17/30696
See application file for complete search history.

(56) References Cited

U.S. PATENT DOCUMENTS

| | | |
|---|---|---|
| 5,680,475 A | 10/1997 | Zwierski et al. |
| 5,774,833 A | 6/1998 | Newman |
| 6,049,811 A | 4/2000 | Petruzzi et al. |
| 6,078,327 A | 6/2000 | Liman et al. |
| 6,271,846 B1 | 8/2001 | Martinez et al. |
| 6,298,327 B1 | 10/2001 | Hunter et al. |

(Continued)

OTHER PUBLICATIONS

Yaakov Yaari, "Texplore—exploring expository texts via hierarchical representation" (pp. 25-32) Feb. 28, 2003.

*Primary Examiner* — Kristopher Andersen
(74) *Attorney, Agent, or Firm* — Neo IP

(57) ABSTRACT

Systems and methods for cladistics-based content searching, analysis, and diagrammatic representation of results; the importing of patent claims, parsing of the claims into their elements and sub-elements, semantically analyzing the claims sub-elements to determine the technology; semantically analyzing the database records to find matching technology content, displaying the matching technology content, and visually linking the matching technology content to relevant hierarchically-displayed elements and sub-elements.

12 Claims, 20 Drawing Sheets

(56) References Cited

U.S. PATENT DOCUMENTS

| | | |
|---|---|---|
| 6,339,767 B1 | 1/2002 | Rivette et al. |
| 6,449,026 B1 | 9/2002 | Min et al. |
| 6,499,026 B1 | 12/2002 | Rivette et al. |
| 6,738,761 B1 | 5/2004 | Oura |
| 7,290,223 B2 | 10/2007 | Decombe |
| 7,353,464 B1 | 4/2008 | Kundu et al. |
| 7,739,133 B1 | 6/2010 | Hail et al. |
| 7,770,107 B2 | 8/2010 | Jiang et al. |
| 7,797,336 B2 | 9/2010 | Blair et al. |
| 7,949,728 B2 | 5/2011 | Rivette et al. |
| 8,196,030 B1 | 6/2012 | Wang et al. |
| 2001/0049707 A1 | 12/2001 | Tran |
| 2002/0000998 A1 | 1/2002 | Scott et al. |
| 2002/0007373 A1 | 1/2002 | Blair et al. |
| 2002/0022974 A1 | 2/2002 | Lindh |
| 2002/0103809 A1 | 8/2002 | Starzl et al. |
| 2002/0107896 A1 | 8/2002 | Ronai |
| 2002/0184254 A1 | 12/2002 | Williams et al. |
| 2002/0188608 A1 | 12/2002 | Nelson et al. |
| 2003/0014415 A1 | 1/2003 | Weiss et al. |
| 2003/0033295 A1 | 2/2003 | Adler et al. |
| 2003/0061243 A1 | 3/2003 | Kim et al. |
| 2003/0065637 A1 | 4/2003 | Glasgow |
| 2003/0093755 A1 | 5/2003 | O'Carroll |
| 2003/0154204 A1 | 8/2003 | Chen-Wright et al. |
| 2004/0015481 A1 | 1/2004 | Zinda |
| 2004/0073850 A1 | 4/2004 | Opaterny |
| 2004/0078192 A1 | 4/2004 | Poltorak |
| 2004/0215612 A1 | 10/2004 | Brody |
| 2004/0243387 A1 | 12/2004 | Brabander |
| 2005/0071349 A1 | 3/2005 | Jordan et al. |
| 2005/0234685 A1 | 10/2005 | Tanigawa |
| 2007/0022110 A1 | 1/2007 | Suda et al. |
| 2007/0233692 A1 | 10/2007 | Lisa et al. |
| 2007/0294664 A1 | 12/2007 | Joshi |
| 2010/0190143 A1 | 7/2010 | Gal et al. |

Websites 121

Go to Most Relevant Content

|     | 301 | 302 | 303 | 304 | 305 | 306 |
|-----|-----|-----|-----|-----|-----|-----|
| 201 | X   |     | X   | X   | X   | X   |
| 202 | X   | X   | X   | X   | X   | X   |
| 203 |     | X   | X   | X   |     |     |
| 204 | X   | X   | X   |     |     | X   |

FIG. 19
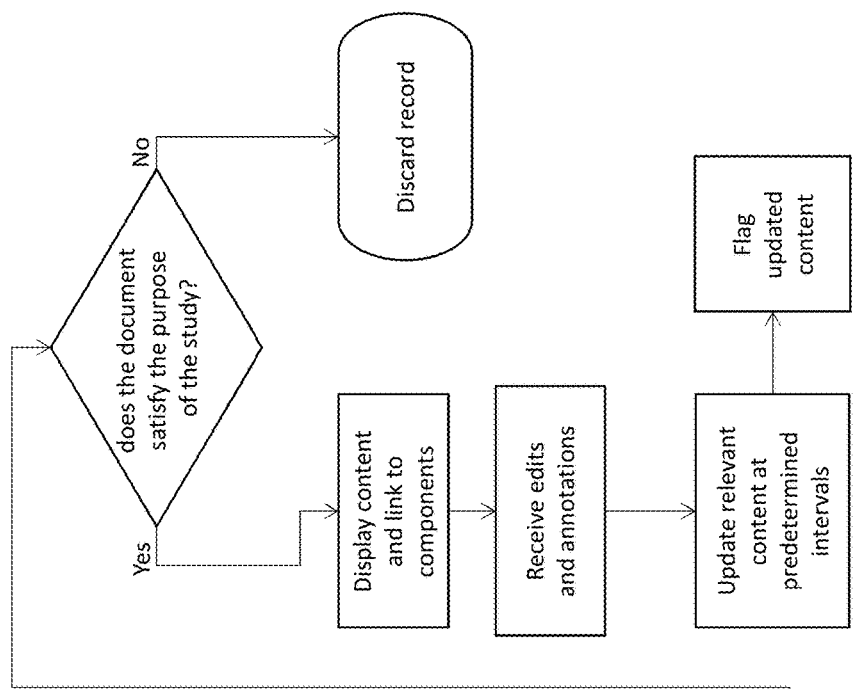
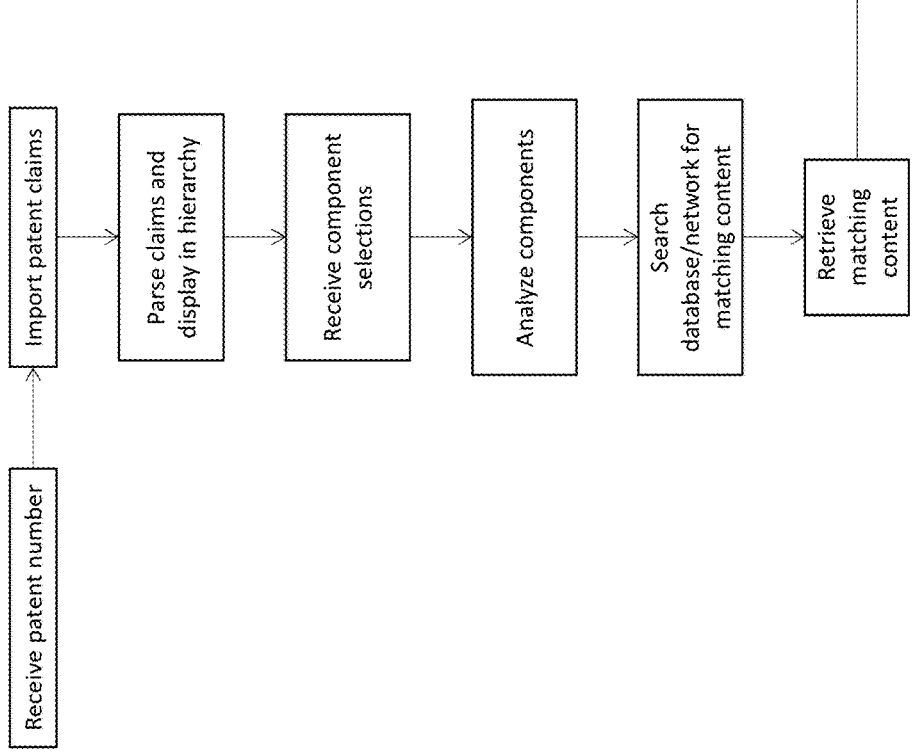

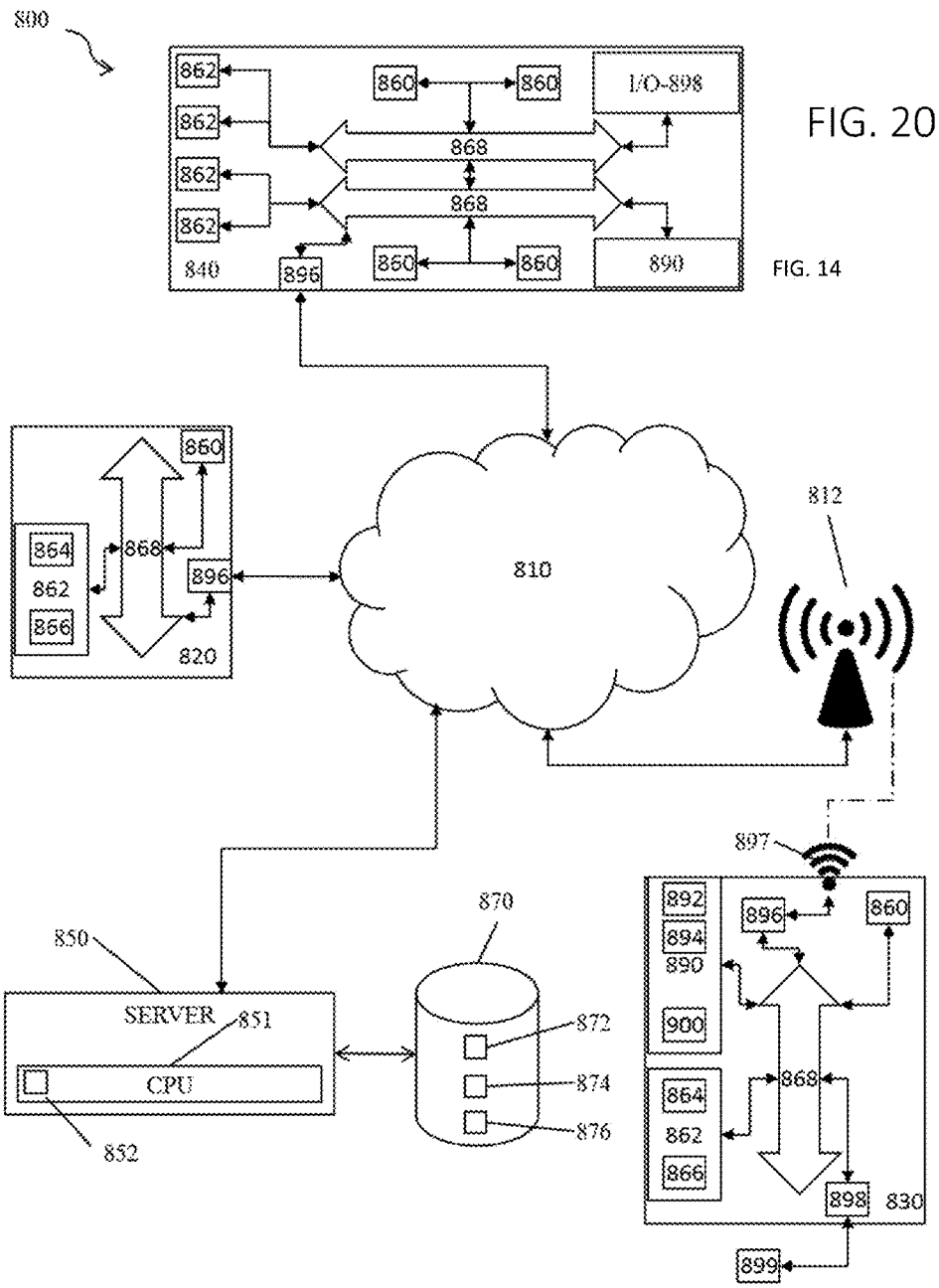

METHODS AND SYSTEMS FOR TECHNOLOGY ANALYSIS AND MAPPING

CROSS-REFERENCE TO RELATED APPLICATIONS

This application relates to and claims priority from the following U.S. patent applications. This application is a continuation-in-part of U.S. application Ser. No. 10/963,131, filed Oct. 12, 2004, which is a non-provisional application of U.S. Provisional Application No. 60/510,734 filed Oct. 11, 2003 and U.S. Provisional Application No. 60/527,788 filed Dec. 8, 2003, each of which is hereby incorporated by reference in their entirety. This application is also a continuation-in-part of U.S. application Ser. No. 15/241,578 filed Aug. 19, 2016, which is a continuation-in-part of U.S. application Ser. No. 14/822,405, filed Aug. 10, 2015, which is a continuation of U.S. application Ser. No. 12/633,917, filed Dec. 9, 2009; which is a continuation of U.S. application Ser. No. 10/983,458, filed Nov. 8, 2004, which is a non-provisional application of U.S. Provisional Application No. 60/518,119 filed Nov. 7, 2003, each of which is hereby incorporated by reference in their entirety.

BACKGROUND OF THE INVENTION (1) Field of the Invention

The present invention relates generally to automated work processes and, more particularly, to an automated search, display and analysis of databases content, including but not limited to technology, inventions, patents, and patent-related information and/or documents.

(2) Description of the Prior Art

Database searching can be divided into two major types of searching—non-patent legal database searching and patent legal database searching.

Non-patent legal database searching, for whom the computerized search engines where first designed, is directed toward the task of extracting few, precise records. These queries and searches engines are designed to bring out the fewest documents possible to fulfill the needs of the searcher. This type of prior art searching requires that the user submit keywords to a search engine to get a single set of results. The user can use Boolean operators, such as AND, OR, ANDNOT (also NOT), etc. to more precisely define the search. The user can also weight keywords such that the results are ranked. However, neither increasing the precision of the search nor ranking the results ensures the thoroughness of the search and, in fact, both methods are designed to reduce the number of returned records.

In contrast, prior art searching for patent legal needs is designed to be thorough to ensure that the invention is novel and non-obvious. The traditional method is to search through all the records in the classes to which an invention may belong. This method is thorough, but is laborious and time-consuming. Additionally, other sources of prior art exist that are not classified and patent databases per se are becoming to large to be searched by this method. Persons wishing to search these databases in a timely manner frequently construct one or more queries to thoroughly cover the invention field. However, these search methods are idiosyncratic and not generally executed according to a predetermined method. The thoroughness of the search must therefore be closely evaluated each time.

Thus, a need exists for database content searching, particular for technology, patent, and/or prior art searching methods and systems that are precise and thorough, easily evaluated and supervised, and which minimizes the number of records that an examiner must review to perform a precise and thorough examination. In addition, a need exists for a method of displaying the large amounts of data in a single view while allowing examination of individual records, such that the user or viewer can assess the technology field density and inspect individual records from the same view.

SUMMARY OF THE INVENTION

The present invention is directed to systems and methods for content searching, analysis, and diagrammatic representation of results in graphical user interface format for viewing by at least one user on a computer-type device or network, in particular for technology and patent-related content stored in at least one database.

The present invention provides a system, method, and/or a graphical user interface for searching a database, analyzing patent claims, retrieving relevant technology content, and displaying the patent claims and relevant technology content, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and running on the at least one computer for querying a database; the at least one computer connected to the database, either directly or via a network; wherein the software queries using a cladistics-based model; wherein at least one user is searches the database and reviews search results presented in a graphical representation on a user interface, in particular where the graphical representation is a tree diagram; and wherein the software also automatically imports patent claims, parses the patent claims hierarchically, generates a hierarchical claims diagram, and outputs a viewable diagram of the parsed claims; wherein the claims diagram shows at least part of a patent claims series in an interactive format that permits expansion and compression of the at least part of a patent claims series according to the hierarchy of the at least part of a patent claims series; and wherein the software receives sub-element selections, analyzes the sub-element selections for technology content, searches the at least one database for matching technology content, retrieves the matching technology content, receives a study purpose; analyzes in real-time a matching technology content record for matching the study purpose, retrieves in real-time the matching technology and study purpose content, displays matching technology and study purpose content thumbnail images beside the patent claims diagram, and displays matching technology content thumbnail images beside the patent claims diagram, and links the thumbnail images to their sub-element.

These and other aspects of the present invention will become apparent to those skilled in the art after a reading of the following description of the preferred embodiment when considered with the drawings.

BRIEF DESCRIPTION OF THE DRAWINGS

FIG. 6 is a screen view of an automated system according to the present invention.

FIG. 9 is a screen view of an automated system according to the present invention.

FIG. 11 is a screen view of an automated system according to the present invention.

FIG. 17 is the user interface of FIG. 16 with a relevant technology content expanded for examination.

FIG. 18 is a prior art diagram of a prior art claims infringement matrix.

FIG. 19 is a flow diagram of a process according to the present invention.

FIG. 20 is a schematic of a computer network system according to the present invention.

DETAILED DESCRIPTION OF THE PREFERRED EMBODIMENTS

Figure 1:
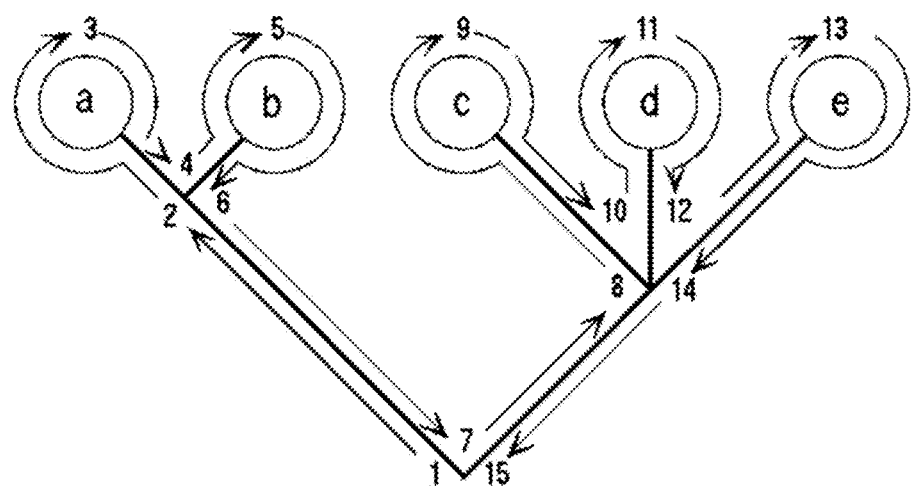
FIG. 1 is a view of a tree map constructed according to one format of mapping.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

The present invention uses techniques and methodologies developed to analyze evolutionary relationships among living and fossil organisms for the analysis of the relationship of intellectual assets, including but not limited to ideas, inventions, and/or documents, e.g., patent applications, patent and technical publications, and issued patents and the like. The field of cladistics is a method of analyzing the evolutionary relationships between groups to construct their family tree. The principle behind cladistics is that organisms should be classified according to their evolutionary relationships, and that the way to discover these relationships is to analyze what are called primitive and derived characters. The present invention uses characters of the invention, also called components, elements, or functions, as the analog to organism characters; in the following description, discussion of cladistics and evolutionary biology are used as an analogy or parallel for similar methodologies applied to technology and intellectual assets. As such, any substitution of intellectual assets elements or components for biological characters and/or characteristics is appropriate in describing the present invention. However, significantly the direct application of cladistics software and/or methodologies must be adapted and modified in order to function effectively in an intellectual assets environment for research and analysis thereof. It is important to recognize that the invention, for example, must be broken into its functional components in order to be analyzed by a cladistics-based methodology; this selection is critical for an effective analysis of the invention and comparison with other inventions in a related field.

The real merit of cladistic methods is in their use of shared derived characters to unite groups and in the ability of the computer to handle large batches of data. Using cladistics methods, inventions can likewise be grouped and relationships between the objects studied, which in the case of the present invention may include at least one of the following and/or combinations thereof: ideas, inventions, disclosure documents, patent applications, patent publications, issued patents, technical publications or documents, and the like.

Cladistics is a particular method of hypothesizing relationships among organisms. In the case of the present invention, cladistics-like methodologies are applied to intellectual asset research and analysis by substituting at least one of the following and/or combinations thereof: ideas, inventions, disclosure documents, patent applications, patent publications, issued patents, technical publications or documents, and the like, in the place of each organism and/or gene sequence. Like other methods, it has its own set of assumptions, procedures, and limitations. The basic idea behind cladistics is that members of a group share a common evolutionary history, and are "closely related", more so to members of the same group than to other organisms; similarly, the present invention employs cladistics-like methodologies to explore and analyze evolutionary patterns within intellectual asset groups and/or subgroups. These groups are recognized by sharing unique features which were not present in distant ancestors. These shared derived characteristics are called synapomorphies. Note that it is not enough for organisms to share characteristics, in fact two organisms may share a great many characteristics and not be considered members of the same group. For example, consider a jellyfish, starfish, and a human, and consider which two are most closely related. The jellyfish and starfish both live in the water, have radial symmetry, and are invertebrates, so you might suppose that they belong together in a group. This would not reflect evolutionary relationships, however, since the starfish and human are actually more closely related. It is not just the presence of shared characteristics which is important, but the presence of shared derived characteristics. In the example above, all three characteristics are believed to have been present in the common ancestor of all animals, and so are trivial for determining relationships, since all three organisms in question belong to the group "animals". While humans are different from the other two organisms, they differ only in characteristics which arose newly in an ancestor which is not shared with the other two. Therefore, choosing the right characters is one of the most important steps in a cladistic analysis. Similarly, selecting the appropriate key components and elements, and related subcomponents or subelements, sub-subcomponents or sub-subelements, etc. is one of the most important steps in cladistic-like intellectual asset research and analysis, according to the present invention.

In the analyses of intellectual assets, including but not limited to ideas, inventions, and/or documents, including but not limited to patent applications, patent and technical publications, and issued patents, it is important to include the use of the invention in analyses. For example, the use of the invention, generally described in the preamble of the independent claim, can be included in the cladistic analysis to ensure that inventions with similar uses are grouped more closely than ones with different uses.

Alternatively, if the use character is not used in the analyses, the resulting analyses will more closely group inventions with similar non-use characters without regard to the invention use. This analysis may be useful for studying convergent evolution of inventions. Similarly, if, in the case of an invention, the element is not used in the analysis, the resulting diagrammatic representation of the group of inventions will produce a more closely related group of inventions with similar elements.

Following is an outline of the basic steps necessary for completing a cladistic analysis of inventions.

1. Determine the characters (features of the invention) and perform a search of an invention database to determine the inventions with one or more of the characters.
2. Group inventions by their shared characteristics.
3. Build an invention cladogram of the groups.

Because essential functional characters generally must be recited in the claims of a patent, searching only the claims field of inventions versus searching the specification field generally results in less erroneous hits. The reduction of these "false positives" greatly reduces the burden of reading through the hits. In addition to the basic analysis outlined above, more complicated analyses can be performed prior to mapping the results.

Analytical Methods

For example, the following cladistics or phylogenetic analysis methods, including tree mapping methods, can be used to analyze the dataset, including at least one intellectual asset, invention, and/or document, including but not limited to patent applications, patent and technical publications, and patent applications: Parsimony methods such as Exhaustive, branch-and-bound and heuristic algorithms, Wagner, Fitch and Dollo characters, Bootstrap, strict and majority rule consensus trees, and Consistency and retention indices; Distance matrix methods; Computation of distances methods; Maximum likelihood methods; Quartets methods; Artificial-intelligence methods; Invariants, or Evolutionary Parsimony, methods; Bootstrapping and other measures of support; Compatibility analysis; Consensus trees and distances between trees; Tree-based alignment; Biogeographic analysis and host-parasite comparison; Comparative method analysis; Simulation of trees or data; Examination of shapes of trees; Clocks, dating and stratigraphy; Biostratigraphy with the methods of Unitary Associations and Ranking-Scaling, Description or prediction of data from trees; Tree plotting/drawing; and the like.

The results can be mapped using tree mapping methods. In the case of tree mapping analyses, the resulting maps are already mapped.

Artificial intelligence algorithms can also be used. For example, SOTA, a software package that runs a Self Organizing Tree Algorithm, is based on Kohonen's unsupervised neural network of self-organizing maps and on Fritzke's growthing cell structures algorithm to construct phylogenetic trees from biological molecular sequence data. It is described in a paper: Dopazo, J. and J. M. Carazo. 1997. Phylogenetic reconstruction using an unsupervised growing neural network that adopts the topology of a phylogenetic tree. Journal of Molecular Evolution 44a: 226-233. incorporated herein by reference in its entirety. SOTA can use sequence data, distance matrix data, or dipeptide frequencies from proteins. SOTA is available as source code in C for Unix, as executables for SGI workstations, and also with a Windows program called Drawer that draws the resulting trees.

Additionally, because the time component and dependency, which are the time of filing and the cited prior art, are known for inventions, that is, analyses such as invention rate can be computed using mutation rate analysis and mapping methods and invention dependency can be analyzed and mapped using host-parasite analysis and mapping methods.

Tree Types

Once the analyses and groupings have been performed, the results can be displayed in a tree format. Various tree shapes can be used to display the results, including Radial, Slanted cladogram, Rectangular cladogram, Phylogram, and the like.

Figure 2:
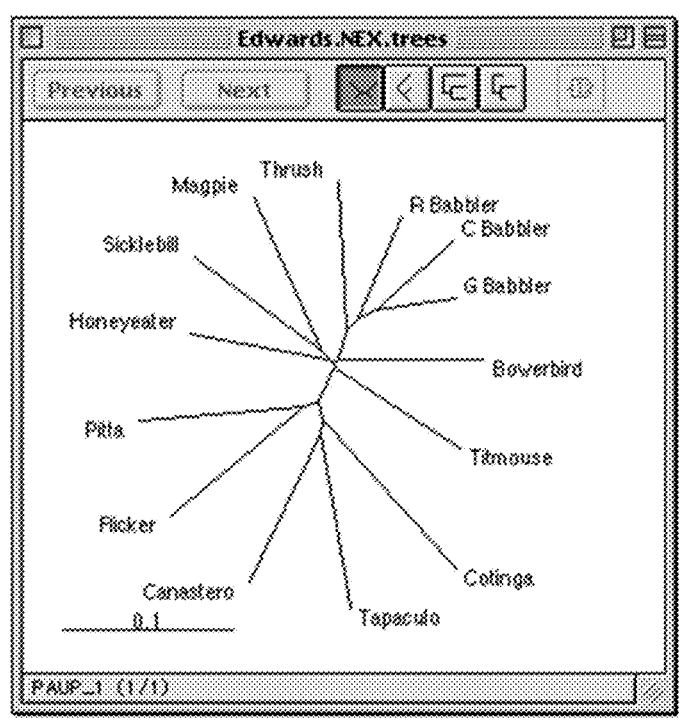
FIG. 2 is a radial tree map with scaled branches.

Phylogram mapping is only available if the tree has branch lengths. Radial trees draw the tree as an unrooted tree radiating from a central point, as shown in FIG. 2. Branches are scaled by their length (if the tree has branch lengths); otherwise each branch has the same length. Some programs store information about the internal nodes as labels for those nodes. Examples include PHYLIP CONSENSE and CLUSTALW which store cluster or split frequencies in the tree description, although they do it differently: The PHYLIP CONSENSE program stores the frequency of groups in the consensus tree as edge lengths. CLUSTALW *.PHB files store bootstrap values as labels of the internal nodes of the tree.

A tree can be ordered such that "heavier" nodes (i.e., those with more descendants) are either drawn to the left or right.

A set of inventions can be defined as the outgroup, such that the tree can be rooted to the group. TREE REPRESENTATION The "Newick 8:45" format is one format used to describe a tree. A brief description follows.

To write a tree description visit all the nodes in the tree, starting at the root, and follow these rules: If the node is a leaf (=terminal taxon) Write the node's label, then return to the node's immediate ancestor. If the branch leading to the leaf has a length, write a colon then the length immediately after the leaf label, e.g "human:0.0167". If the node is an internal node: 1. If you're visiting the node for the first time, write a left parenthesis "(", then visit the node's leftmost child. 2. If you've already visited the node before, but haven't yet visited all that node's descendants, write a comma ",", then visit the next descendant of the node (going from left to right). 3. If you've already visited the node before, and you've visited all the node's descendants, write a right parenthesis ")". If the node has a label (e.g. a bootstrap value) then write that label now, e.g. ")100". If the branch leading to the node has a length, write a colon then the length immediately after the leaf label, e.g "):0.08". and visit the node's immediate ancestor (if any). If the current node is the root then terminate the description with a semicolon ";" and stop. Here is a simple tree and the sequence of steps USED to describe it. Applying the rules to this tree, the description evolves as follows: Step Tree description 1 (2 ((3 ((a 4 ((a, 5 ((a,b 6 ((a,b) 7 ((a,b), 8 ((a,b),(9 ((a,b),(c 10 ((a,b),(c, 11 ((a,b),(c,d 12 ((a,b),(c,d, 13 ((a,b),(c,d,e 14 ((a,b),(c,d,e) 15 ((a,b),(c,d,e)) 16 ((a,b),(c,d,e)); This tree is represented in FIG. 1.

Tree Manipulation

Branches can be moved for rerooting, polytomy formation, and rearranging the appearance of the tree. Some examples of these tree manipulations include:

collapsing a branch to produce a polytomy;

collapsing an internal branch to collapse the clade above that branch;

clicking on a branch to reroot the tree on the branch.

The next four tools change the appearance of the tree in the window, but do not affect the cladistic topology:

Branch Rotation rotates the descendants of a binary node, so that the left descendant is now the right descendant, and visa-versa. You can only use this tool on binary internal nodes.

Branch Exchange, which interchanges pairs of branches, rearranges the descendants of a polytomy.

Ladderize left/right orders the subtree rooted at the branch clicked on so that the "heavier" nodes (those nodes with the largest clusters) appear leftmost/rightmost (uppermost/lowermost).

Branch Lengths

If the tree being viewed has branch lengths, and you are viewing the tree as either unrooted or as a phylogram, then the branch lengths can be drawn to scale. The units for this scale depend on those used to construct the tree. For example, as shown in FIG. 2, most tree-building programs output distances as numbers of substitutions per site. For such trees, some programs typically displays a scale of "0.1", meaning 0.1 nucleotide substitutions per site. The actual value will depend on the branch lengths in the tree. Other trees, such as those computed using parsimony, may have integer branch lengths (i.e., 1, 5, 10), and hence the scale bar will be in units appropriate to the tree. For example, a value of "10" means 10 steps.

Evolutionary Distances

Evolutionary distance between a pair of sequences is usually measured by the number of nucleotide (or amino acid) substitutions between them. Evolutionary distances are fundamental for the study of molecular evolution and are useful for phylogenetic reconstruction and estimation of divergence times.

In MEGA, most of the widely used methods for distance estimation for nucleotide and amino acid sequences are included. In the following, a brief discussion of these methods is presented in three sections: nucleotide substitutions, synonymous-nonsynonymous substitutions, and amino acid substitutions. Further details of these methods and general guidelines for the use of these methods are given in Nei and Kumar (2000). Note that in addition to the distance estimates, MEGA2 also computes the standard errors of the estimates using the analytical formulas and the bootstrap method.

Nucleotide Sequences are compared nucleotide-by-nucleotide. These distances can be computed for protein coding and non-coding nucleotide sequences.

Synonymous & nonsynonymous Sequences are compared codon-by-codon. These distances can only be computed for protein-coding sequences or domains.

Amino acid Amino acid sequences are compared residue-by-residue. These distances can be computed for protein sequences and protein-coding nucleotide sequences. In the latter case, protein-coding nucleotide sequences are automatically translated using the selected genetic code table.

Distance methods included in MEGA are as follows: Nucleotide No. of differences p-di stance Jukes-Cantor distance (with Gamma model) Tajima-Nei distance Kimura 2-parameter distance (with Gamma model) Tamura 3-parameter distance Tamura-Nei distance (with Gamma model) Syn-Nonsynonymous Nei-Gojobori Method Modified Nei-Gojobori Method Li-Wu-Luo Method Pamilo-Bianchi-Li Method Kumar Method Amino acid No. of differences p-distance Poisson correction Gamma distance Bootstrap The Bootstrap method computes standard error of distance estimates. When you choose the bootstrap method for estimating the standard error, you need to specify the number of replicates and the seed for the psuedorandom number generator. In each bootstrap replicate, the desired quantity will be estimated and then the standard deviation of the original values will be computed (see Nei and Kumar [2000], page 25 for details). It is possible that in some bootstrap replicates the quantity you desired is not calculable due to statistical or technical reasons. In this case, MEGA will discard the results of those bootstrap replicates and the final estimates will be based on the results of all the valid replicates. This means that the actual number of bootstrap replicates used can be smaller than the number specified by the user. However, if the number of valid bootstrap replicates is less than 25, then MEGA will report that the standard error cannot be computed (a n/c sign will appear in the result window).

DNA and RNA analysis programs, which are based on comparison using 4 character states—ATCG or AUCG, can still be used to analyze inventions, although only 2 character states per function will be used.

Figure 3:
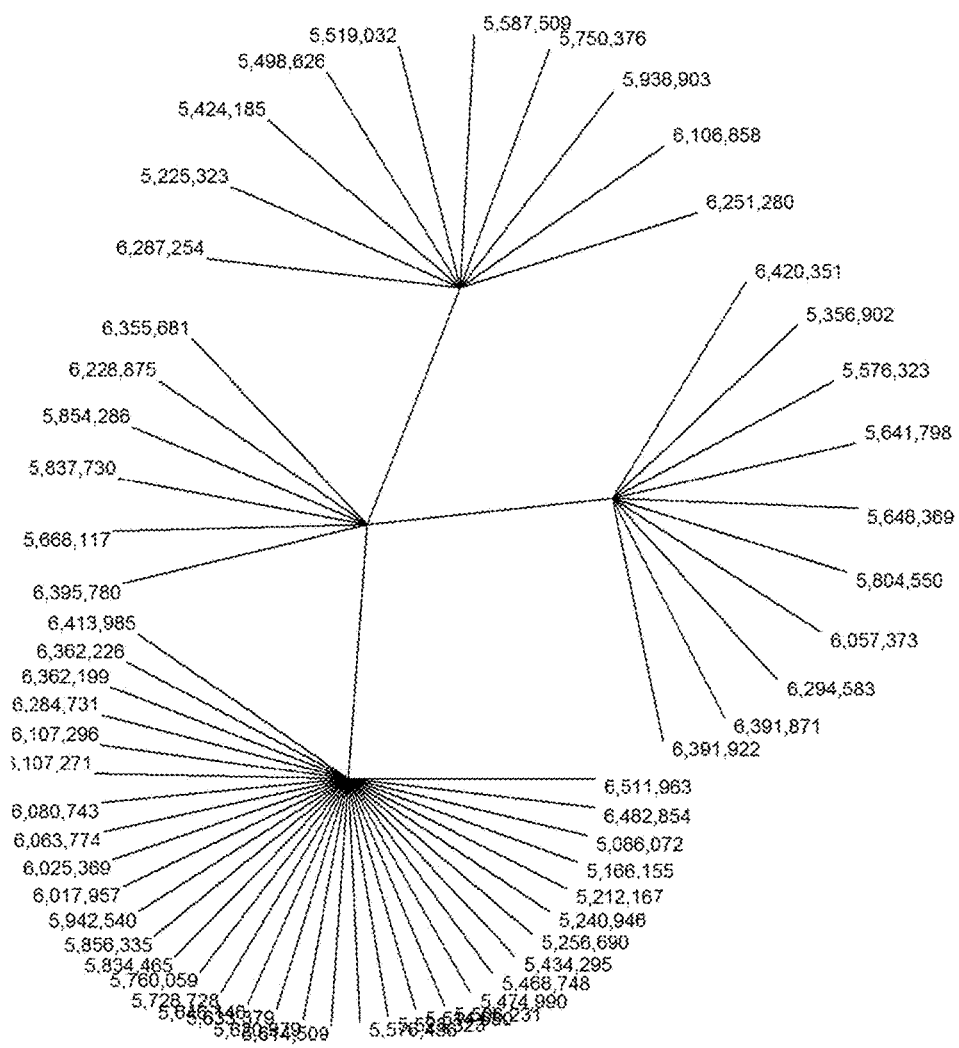
FIG. 3 is a radial map of a prior art search according to the present invention.

Examples of other analytical software packages that use these and other methods that can be used to map invention relationships:

Unix (source code in C or executables): PHYLIP; PAUP*; Fitch programs; Phylo_win ODEN TreeTree GCG Wisconsin Package SeqPup Lintre RSVP Microsat OSA TREE-PUZZLE AMP fastDNAml MOLPHY PAML SplitsTree PLATO STATGEOM PHYLTEST PARBOOT TreeAlign ClustalW MALIGN GeneDoc COMPARE TheSiminator Seq-Gen TreeTool GDE sog TreePack Phylodendron Treevolve and PTreevolve PSeq-Gen njbafd gmaes GCUA DERANGE2 LVB BIONJ TAAR ANCML QDate Bootscanning Package Ctree SOTA PASSML TOPAL reticulate RecPars ARB BIOSYS-2 RAPD-PCR package TreeCons Diversi DISTANCE Darwin sendbs partimatrix BAMBE nneighbor unrooted ROSE weighbor PhyloQuart QR2 VeryfastDNAml LARD puzzleboot Willson quartets programs POY RIND TipDate RRTree Fels-Rand PAL Mavric dnarates CLINCH UO Arlequin vCEBL TrExMl HY-PHY Genie Vanilla PHYCON qclust fastDNAmlRev RevDNArates BRANCHLENGTH TCS CONSEL PC's as Windows executables: PHYLIP PAUP* Tree Gardener TREECON GDA SeqPup MOLPHY WET GeneDoc COMPONENT TREEMAP COMPARE RAPDistance TreeView Phylodendron Molecular Analyst Fingerprinting POPGENE TFPGA Ctree GeneTree MVSP RSTCALC Genetix NJplot unrooted Arlequin DAMBE DnaSP PAML LVB DNASIS minspnet BioEdit ProSeq RRTree Fels-Rand PAL WINCLADA SECANT Nona DNASEP SEPAL Phylogenetic Independence vCEBL HY-PHY TreeExplorer Genie Vanilla MEGA TNT GelCompar II Bionumerics TCS DOS executable (MSDOS, PCDOS) or in a Windows "DOS box": PHYLIP PAUP* MEGA Fitch programs Hennig86 MEGA RA Nona TurboTree Freqpars Fitch programs TREECON Microsat DISPAN RESTSITE NTSYSpc METREE Hadtree, Prepare and Trees PHYLTEST RAPDistance DIPLOMO TREE-PUZZLE ABLE ClustalW MALIGN GeneDoc COMPARE CMAP Random Cladistics CoSta njbafd GEOMETRY PDAP PICA95 REDCON TAXEQ2 BIONJ ANCML REAP MVSP Lintre BIOSYS-2 RAPD-PCR package Diversi T-REX sendbs K2WuLi homoplasy test weighbor POY TreeDis QUARTET2 Network CLINCH Gambit MEAWILK qclust CONSEL Macintosh or PowerMac executables: PHYLIP PAUP* CAFCA MacT TreeTree SeqPup Microsat TREE-PUZZLE fastDNAml MacClade Spectrum SplitsTree PLATO AutoDecay RASA ClustalW TREEMAP CAIC COMPARE PA Bi-De SEQEVOLVE TheSiminator Seq-Gen End-Epi StratCon CONSERVE TreeView NJplot DendroMaker MUST DNA Stacks Phylogenetic Investigator Tree Draw Deck Phylodendron TreeRot Treevolve and PTreevolve PSeq-Gen Molecular Analyst Fingerprinting BIONJ GCUA ACAP GeneTree QDate LVB T-REX unrooted GeneStrut COMPONENT Lite weighbor Modeltest PAML LARD MATRIX Willson quartets programs ALIGN CodonBootstrap DNASIS TipDate RRTree MacroCAIC Fels-Rand PAL RadCon TreeEdit Arlequin vCEBL HY-PHY TreeThief Genie Sequencer Vanilla TCS MrBayes VMS executables or C sources with VMS compilation support: PHYLIP MARKOV TREE-PUZZLE fastDNAml TreeAlign ClustalW Example An example of an analysis with mapping of the results follows:

A described invention was determined to have the following key characters: N-methyl-D-aspartate (nmda); neurotransmitter; and glycine. The N-methyl-D-aspartate AND nmda was used for N-methyl-D-aspartate and the wordstem neurotransmi# was used for the keyword neurotransmitter. Boolean searches of the USPTO database were performed with these words. The first search was performed requiring all characters to exist in the claims field. The resulting dataset had 6 positives, denoted as "ALL" and listed in Table 1. Successive searches were performed by sequentially applying the ANDNOT Boolean modifier to each element in the first search. The results of each search are denoted as NOT glycine, NOT neurotransmi#, and NOT NMDA and shown in Tables 2, 3, and 4, respectively. The datasets were imported into a database and organized into a character matrix. The matrix was analyzed by heuristic analysis and the resulting tree mapped using tree mapping methods. The result is shown in FIG. 3.

TABLE 1

Results of Search in 1976 to present db for:
(((ACLM/nmda OR ACLM/N-methyl-D-aspartate) AND ACLM/neurotransmi$) AND ACLM/glycine): 6 patents.
Hits 1 through 6 out of 6

| | PAT. NO. | Title |
|---|---|---|
| 1 | 6,395,780 | Cleavage system inhibitors as potential antipsychotics |
| 2 | 6,355,681 | Glycine substitutes and precursors for treating a psychosis |
| 3 | 6,228,875 | Methods for treating neuropsychiatric disorders |
| 4 | 5,854,286 | Treatment of negative and cognitive symptoms of schizophrenia with glycine and its precursors |
| 5 | 5,837,730 | Treatment of negative and cognitive symptoms of schizophrenia with glycine uptake antagonists |
| 6 | 5,668,117 | Methods of treating neurological diseases and etiologically related symptomology using carbonyl trapping agents in combination with previously known medicaments |

TABLE 2

Results of Search in 1976 to present db for:
(((ACLM/nmda OR ACLM/N-methyl-D-aspartate) AND ACLM/neurotransmi$) ANDNOT ACLM/glycine): 10 patents.
Hits 1 through 10 out of 10

| | PAT. NO. | Title |
|---|---|---|
| 1 | 6,420,351 | Methods for treating neuropsychiatric disorders |
| 2 | 6,391,922 | Treatment of posttraumatic stress disorder, obsessive-compulsive disorder and related neuropsychiatric disorders |
| 3 | 6,391,871 | Preventing neuronal degeneration in Alzheimer's disease |
| 4 | 6,294,583 | Methods of treating tardive dyskinesia and other movement disorders |
| 5 | 6,057,373 | Methods of treating tardive dyskinesia and other movement disorders using NMDA receptor antagonists |
| 6 | 5,804,550 | Peptide antagonists at glutamate and NMDA receptors |
| 7 | 5,648,369 | Aminoalkylpyridine compounds which are useful as anitconvulsant drugs, excitatory amino acid inhibitors and NMDA sigma receptor antagonists |
| 8 | 5,641,798 | Bicyclic compounds and their use as excitatory amino acid receptor antagonists |
| 9 | 5,576,323 | Excitatory amino acid receptor antagonists |
| 10 | 5,356,902 | Decahydroisoquinoline compounds as excitatory amino acid receptor antagonists |

TABLE 3

Results of Search in 1976 to present db for:
(((ACLM/nmda OR ACLM/N-methyl-D-aspartate) AND ACLM/glycine) ANDNOT ACLM/neurotransmi$): 33 patents.
Hits 1 through 33 out of 33

| | PAT. NO. | Title |
|---|---|---|
| 1 | 6,511,963 | Allosteric modulators of the NMDA receptor and their use in the treatment of CNS disorders and enhancement of CNS function |
| 2 | 6,482,854 | Glaucoma treatment |
| 3 | 6,413,985 | Tetrahydroquinoline derivatives as glycine antagonists |
| 4 | 6,362,226 | Modulation of in vivo glutamine and glycine levels in the treatment of autism |
| 5 | 6,362,199 | Tetrahydroquinoline derivatives as glycine antagonists |
| 6 | 6,284,731 | Allosteric modulators of the NMDA receptor and their use in the treatment of CNS disorders and enhancement of CNS function |
| 7 | 6,107,296 | Neuroprotective use of triazolopyridazine derivatives |
| 8 | 6,107,271 | Neuroactive peptides |
| 9 | 6,080,743 | 2,3-dioxo-1,2,3,4-tetrahydroquinoxalinyl derivatives |

TABLE 3-continued

Results of Search in 1976 to present db for:
(((ACLM/nmda OR ACLM/N-methyl-D-aspartate) AND
ACLM/glycine) ANDNOT ACLM/neurotransmi$): 33 patents.
Hits 1 through 33 out of 33

| | PAT. NO. | Title |
|---|---|---|
| 10 | 6,063,774 | Tricyclic quinoxaline derivatives as neuroprotective agents |
| 11 | 6,025,369 | N-methyl-D-aspartate (NMDA) receptor blockers for the prevention of atherosclerosis |
| 12 | 6,017,957 | Partial agonists of the strychnine insensitive glycine modulatory site of the N-methyl-D-aspartate receptor complex as neuropsychopharmacological agents |
| 13 | 5,942,540 | Methods of providing symptomatic and prophylactic neuroprotection |
| 14 | 5,856,335 | Substituted aminothienopyridines, pharmaceutical composition and use |
| 15 | 5,834,465 | Treatment with combined NMDA and non-NMDA antagonists to reduce excitotoxic CNS damage |
| 16 | 5,760,059 | Indole derivatives |
| 17 | 5,728,728 | Methods of providing neuroprotection |
| 18 | 5,646,146 | Heterocyclic compounds and their preparation and use |
| 19 | 5,633,379 | 3-heteroaliphatyl- and 3-hetero(aryl)aliphatyl-2(1H)-quinolone derivatives |
| 20 | 5,620,979 | Glycine receptor antagonists and the use thereof |
| 21 | 5,614,509 | Pharmaceutical agents for preventing the development of tolerance during the treatment with benzodiazepine-receptor-binding active ingredients |
| 22 | 5,576,436 | Fluorescent ligands |
| 23 | 5,523,323 | Use of partial agonists of the NMDA receptor to reduce opiate induced tolerance and dependence |
| 24 | 5,514,680 | Glycine receptor antagonists and the use thereof |
| 25 | 5,506,231 | Treatment of aids dementia, myelopathy and blindness |
| 26 | 5,474,990 | Barbiturates as safening agents in conjunction with NMDA antagonists |
| 27 | 5,468,748 | 9H-indeno[1,2-b]pyrazine derivatives |
| 28 | 5,434,295 | Neuroprotective pharmaceutical compositions of 4-phenylpinene derivatives and certain novel 4-phenylpinene compounds |
| 29 | 5,256,690 | Method for treating and controlling the symptoms of neurodegenerative disease and neuropsychopharmacological disorders |
| 30 | 5,240,946 | ((2-(amino-3,4-dioxo-1-cyclobuten-1-yl)amino)alkyl)-acid derivatives |
| 31 | 5,212,167 | Modulation of receptor-mediated ion transport |
| 32 | 5,166,155 | Quinoxaline-2,3-dione compounds and their preparation and use |
| 33 | 5,086,072 | Treatment of mood disorders with functional antagonists of the glycine/NMDA receptor complex |

TABLE 4

Results of Search in 1976 to present db for:
((ACLM/glycine AND ACLM/neurotransmi$) ANDNOT
(ACLM/nmda OR ACLM/N-methyl-D-aspartate)): 10 patents.
Hits 1 through 10 out of 10

| | PAT. NO. | Title |
|---|---|---|
| 1 | 6,287,254 | Animal health diagnosis |
| 2 | 6,251,280 | Imprint-coating synthesis of selective functionalized ordered mesoporous sorbents for separation and sensors |
| 3 | 6,106,858 | Modulation of drug loading in multivescular liposomes |
| 4 | 5,938,903 | Microelectrodes and their use in an electrochemical arrangement with telemetric application |
| 5 | 5,750,376 | In vitro growth and proliferation of genetically modified multipotent neural stem cells and their progeny |
| 6 | 5,587,509 | Caged caboxyl compounds and use thereof |
| 7 | 5,519,032 | Substituted aminothienopyridines, pharmaceutical composition and use |
| 8 | 5,498,626 | Acylaminoindole derivatives as 5-ht1 agonists |
| 9 | 5,424,185 | Human high-affinity neurotransmitter uptake system |
| 10 | 5,225,323 | Human high-affinity neurotransmitter uptake system |

Figure 4:
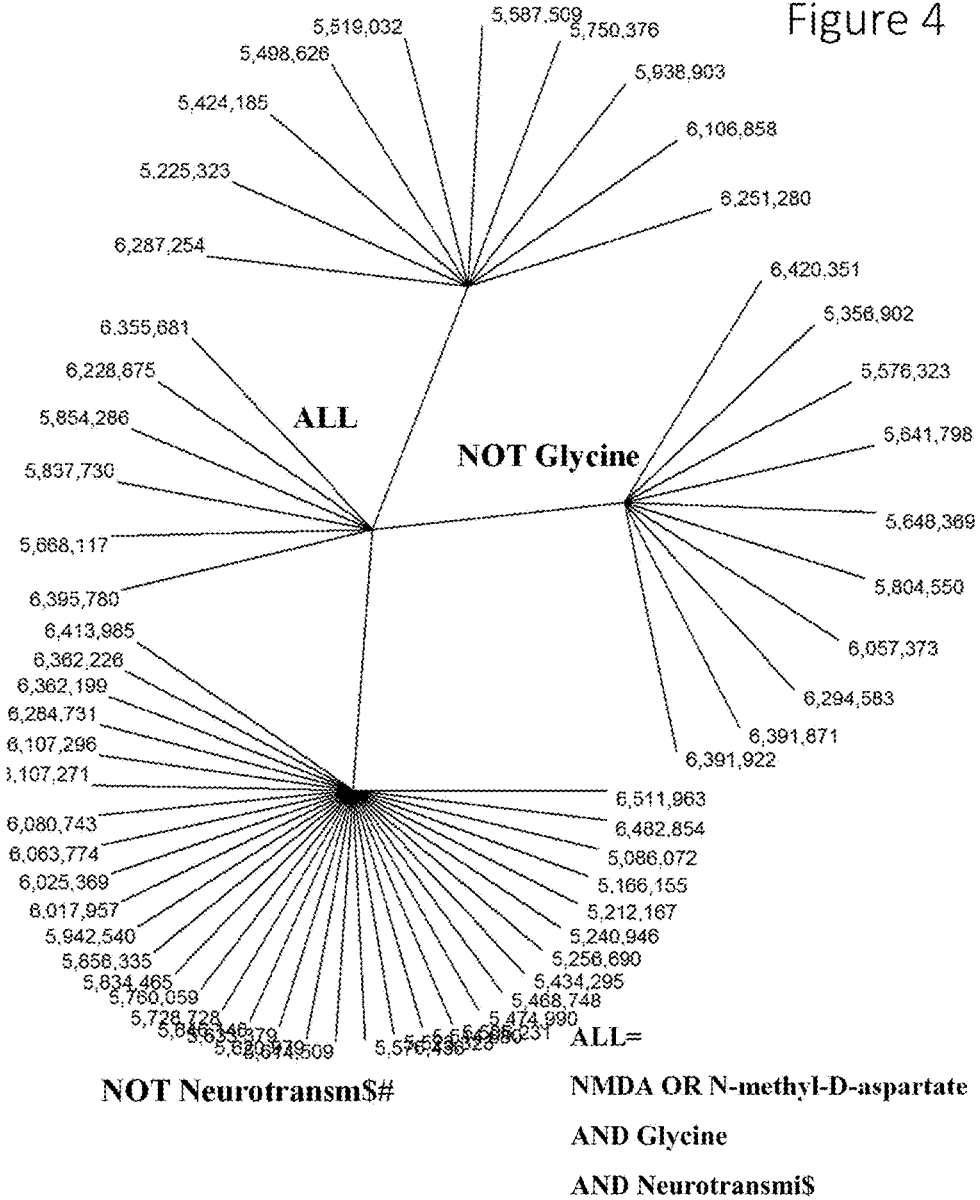
FIG. 4 is a radial map of an ANDNOT prior art search showing nearest synapomorphic competitors.

FIGS. 3 and 4 represent clear and detailed views of inventions that have the same characters as the described invention, represented in the ALL group, and inventions groups that are missing only one character of the search characters. These second groups are described as being one functional character away, evolutionarily speaking, and are potentially nearest synapomorphic competitors. Such a clear and succinct view is very useful to person needing to analyze many search results. Additionally, the graph of the search results linked to the search datasets can be visually projected to facilitate discussion by a group of people more easily than by using text only.

Figure 5:
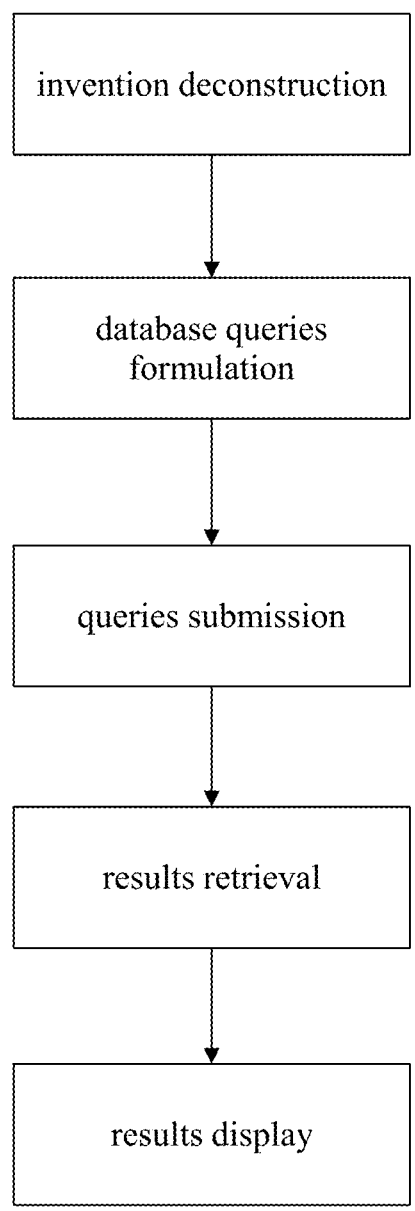
FIG. 5 is a flow diagram of a method according to the present invention.

As best seen in FIG. 5, a flowchart of a method for invention or technology analysis according to the present invention includes the steps of invention deconstruction, database queries formulation, queries submission, results retrieval, and results display.

1. Invention Deconstruction

The invention or entity deconstruction step deconstructs an invention into key components. These key components are those that can be used to distinguish the invention from the prior art. Key components may include such things as physical features, feature location, benefit conferred by a feature, and the like. The field of the invention or the name of the invention may also be included as a key component.

2. Mapping Methods or Query Formulation

The mapping methods herein described segregate a technology or invention field into sub-fields by serial exclusion of key components from queries. The results are kept segregated and displayed as sub-fields. The mapping methods use the key components identified in the deconstruction step to form multiple combinatorial component queries. This mapping, herein termed combinatorial component exclusion mapping, is performed by formulating multiple database queries from the key components identified in the deconstruction step by using combinatorial component exclusion. These combinatorial queries include a first query that searches for all the components in the desired database field, termed the "niche" or "ALL" query, and a series of "neighborhood" queries formed by serial exclusion of at least one component from the query strings. An example follows.

An invention was described as being a contact lens coated with the antimicrobial lactoferrin. The key components of this invention were determined to be a contact lens, lactoferrin, and a coating. Note that the first component is the invention, the second is a physical feature, and the third is the location of the physical feature. These key components are expanded to include synonyms and word stems and are then used to formulate queries according to the present invention. The queries resulting from these components are:

TABLE 5

Unique combinatorial search strings for 3 components.

| Query type | Search strings |
| --- | --- |
| Niche (ALL - A AND B AND C) | "contact lens" AND lactoferrin AND (coat$ or surface) |
| Neighborhood 2 (A AND B NOT C) | "contact lens" AND lactoferrin NOT (coat$ or surface) |
| Neighborhood 3 (A NOT B AND C) | "contact lens" NOT lactoferrin AND (coat$ or surface) |
| Neighborhood 4 (NOT A AND B AND C) | NOT "contact lens" AND lactoferrin AND (coat$ or surface) |

Advantages of Combinatorial Component Exclusion Mapping

Combinatorial component exclusion mapping offers several advantages over the prior art. The mapping is simultaneously precise and thorough. The mapping is precise because the niche group will generally contain the records most like the present invention. The mapping is thorough because adjacent technology fields that contain closely related prior art are also mapped and can be searched. The process is easily supervised because the mapping method is predetermined—the supervisor simply has to determine whether the examiner has identified the proper key components for the mapping and has expanded them correctly and thoroughly.

The method also minimizes in several ways the number of records that an examiner must review to perform a precise and thorough examination. The examiner can look at the niche group to quickly determine if the prior art anticipates or obviates the invention. The examiner can next go to the neighborhood most likely to contain anticipating or obviating art. Knowing which components are missing in a neighborhood prepares the reviewer to look for records that will make the examined invention obvious when reviewing the neighborhoods.

Another advantage of a preferred embodiment of the present invention is the use of ANDNOT exclusion to eliminate overlap. Without the ANDNOT exclusion, the examiner would re-review the ALL group when reviewing each of the neighborhoods. The benefit of the ANDNOT exclusion increases when simultaneously excluding multiple components.

The multiple search strings generated according to the present invention are preferably automatically generated by a computer system.

Figure 6:
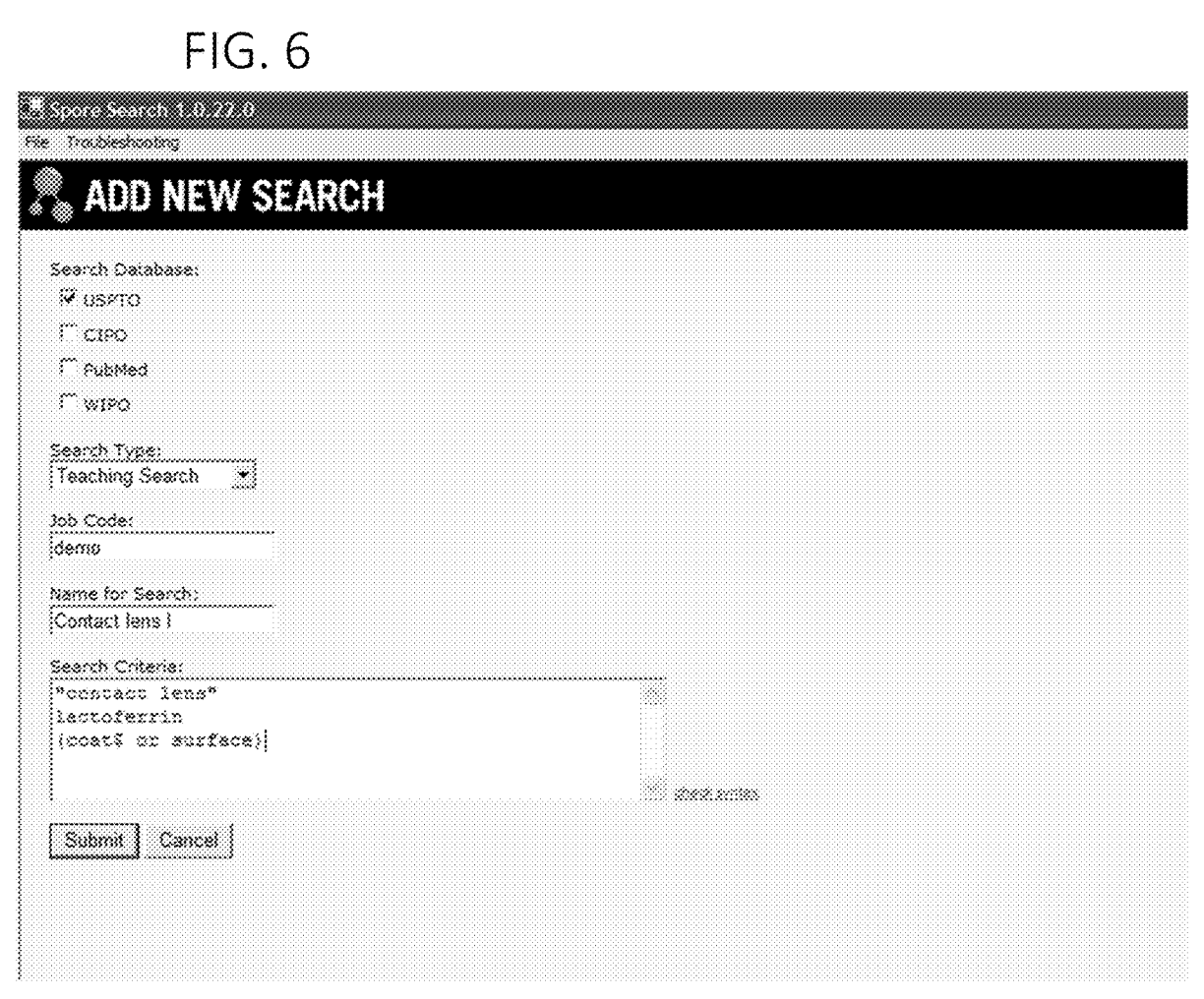

3. The search strings are submitted to at least one database query engine for querying at least one database. The submission to the at least one database query engine is preferably automated and performed by a computer system. The automated query generation and submission facilitates the method and reduces the possibility of error. An example of an automated interface is shown in FIG. 6.

4. Results Retrieval.

Figure 7:
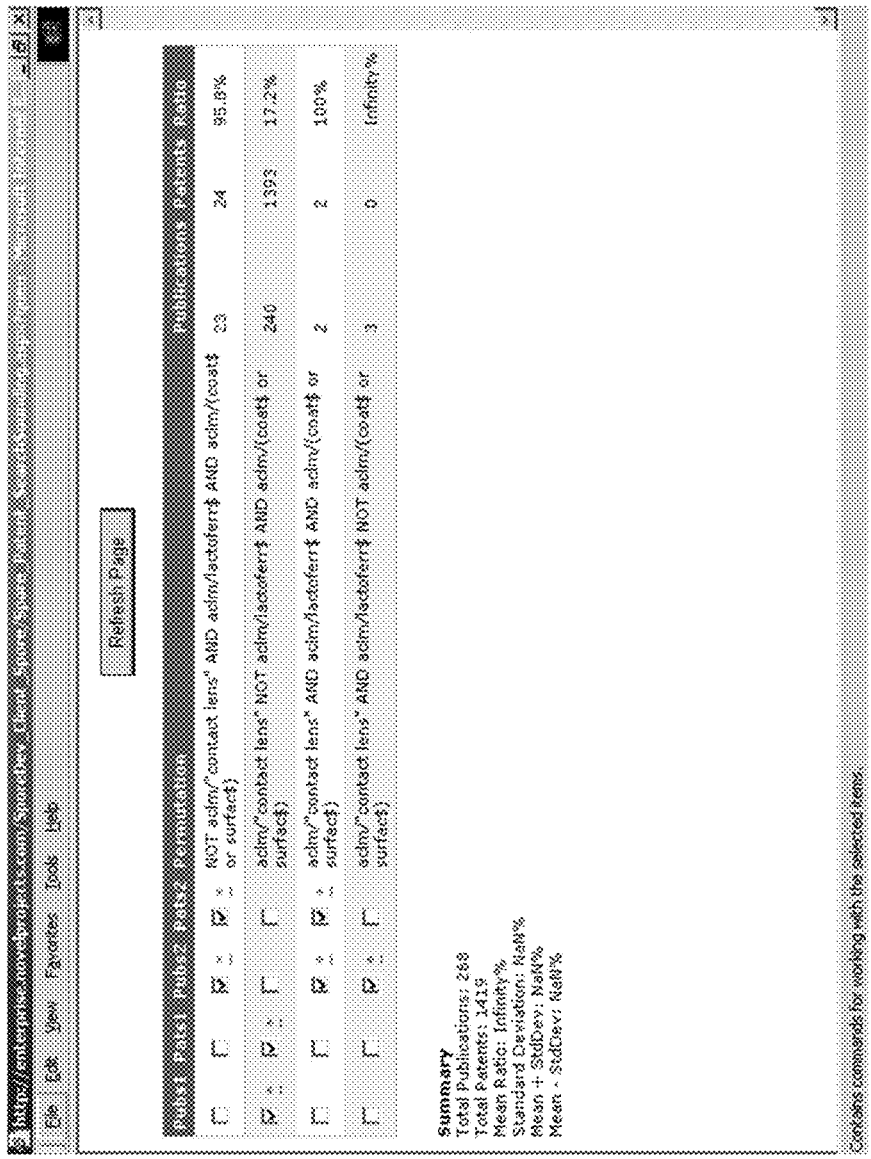
FIG. 7 is a screen view of an automated system according to the present invention.

Preferably, the results are initially displayed as a summary or sounding page, showing the number of hits for each query in each database queried. An example of a sounding page is shown in FIG. 7. In this example, the user sees that the niche search shown in the first row produced 23 hit in the Publications database and 40 hits in the patents database.

Figure 8:
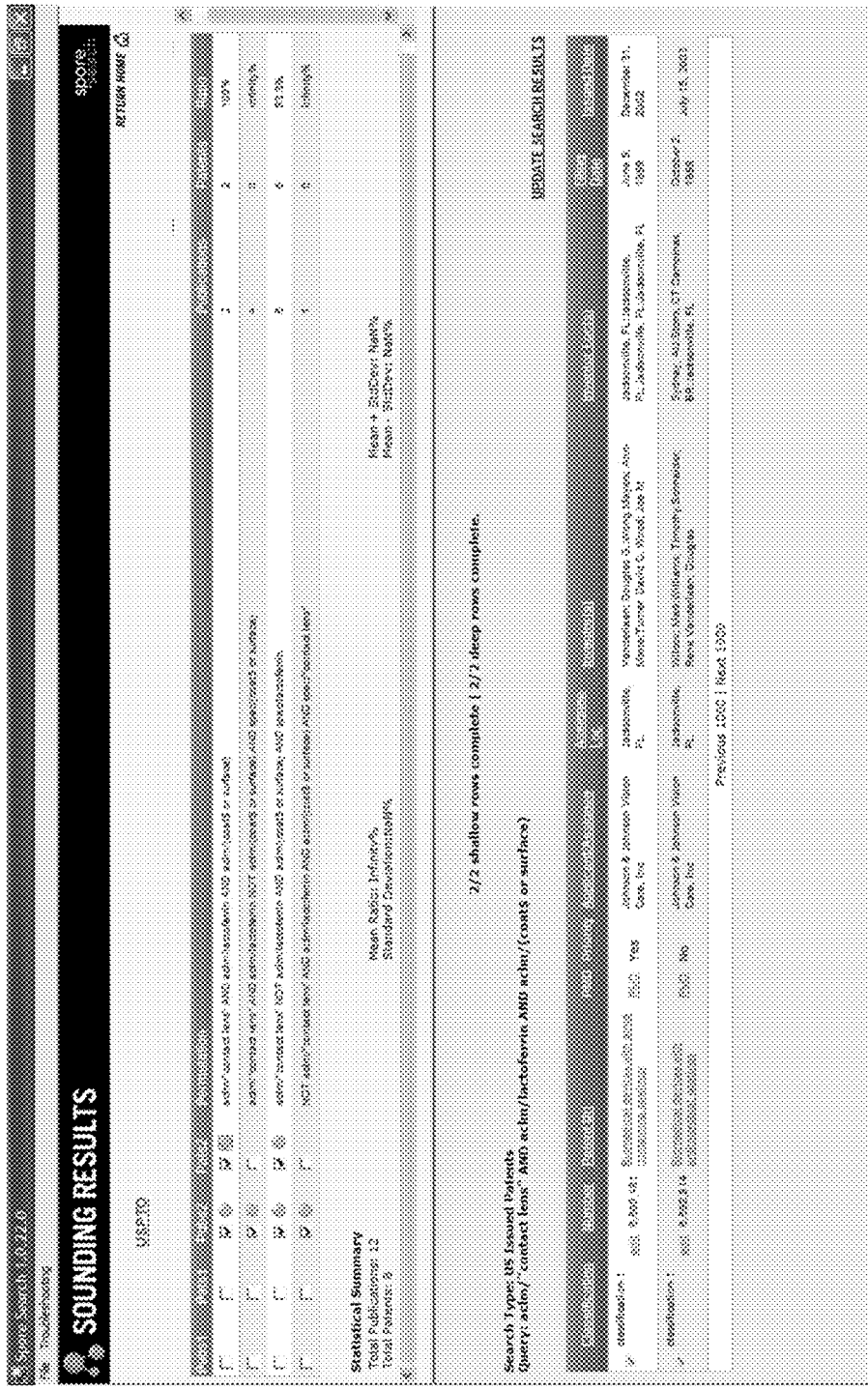
FIG. 8 is a screen view of an automated system according to the present invention.

The user next retrieves preferably only the information needed. There are preferably at least two levels of retrieval. In the present example, by selecting a box in the sounding view from the first level, shown under columns "Pubs1" and "Pats1", the user retrieves only the grant/application number and title. The user can then link to the hits through the icon beside each box to get the hits screen, as shown in FIG. 8, as is commonly done on search engines. In addition to showing the number and title of each hit, the user can link through the patent title to retrieve the patent from the USPTO or local database and can also launch the Patent Matrix software and import the claims from the USPTO by clicking on the software launching link beside each title.

By selecting a box under the columns "Pubs2" or "Pats2", the user directs the system to retrieve relevant bibliographic and content information, such as the abstract, priority cross-reference data (CIP column), assignee information, inventor information, Issue date, filing date, publication date, contact information, and the like.

5. Results Display for Examination and Analysis.

The results can be displayed in several formats. A spreadsheet layout, can be used. Additionally or alternatively, a tree diagram layout can be used.

Figure 9:
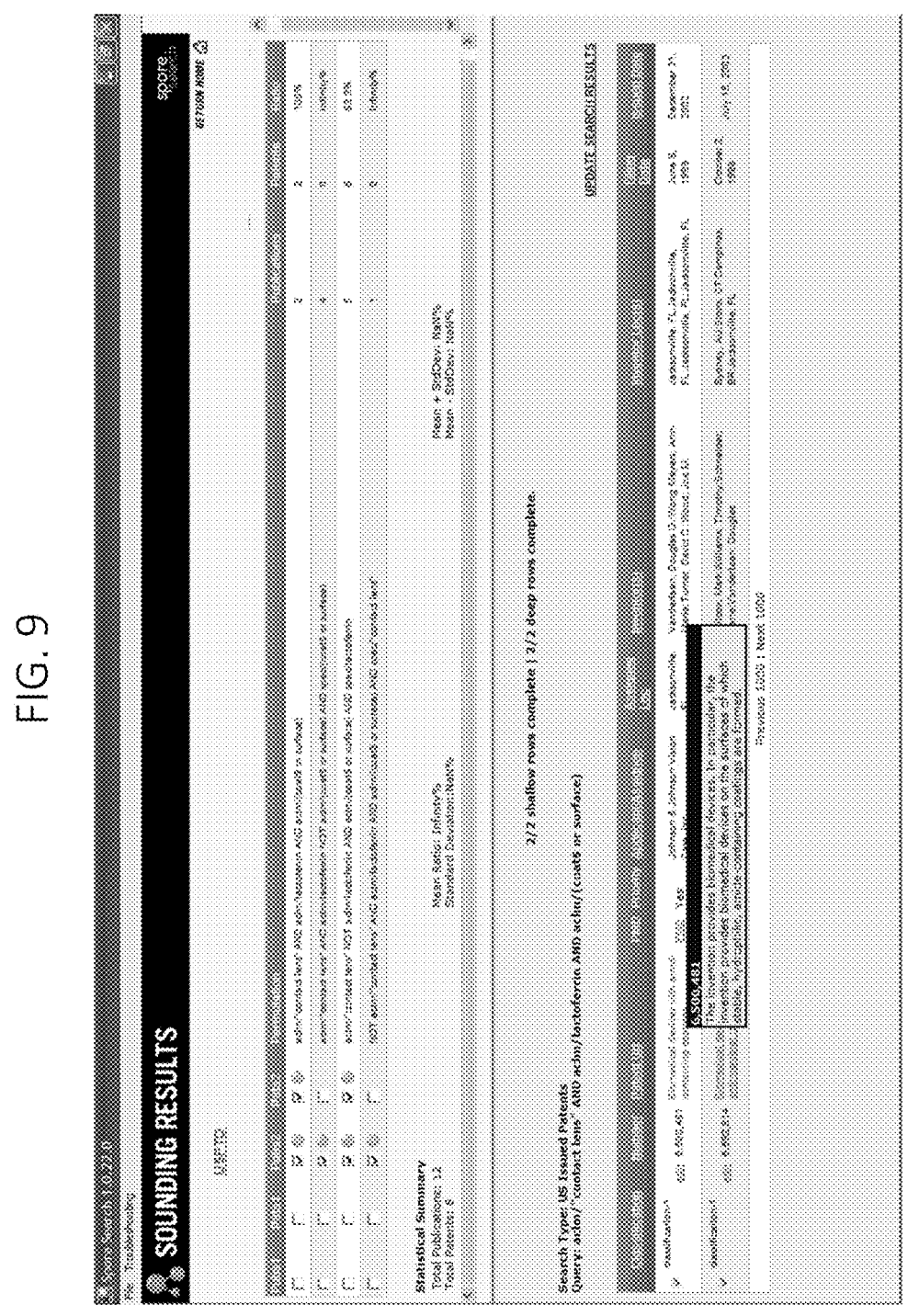
Figure 10:
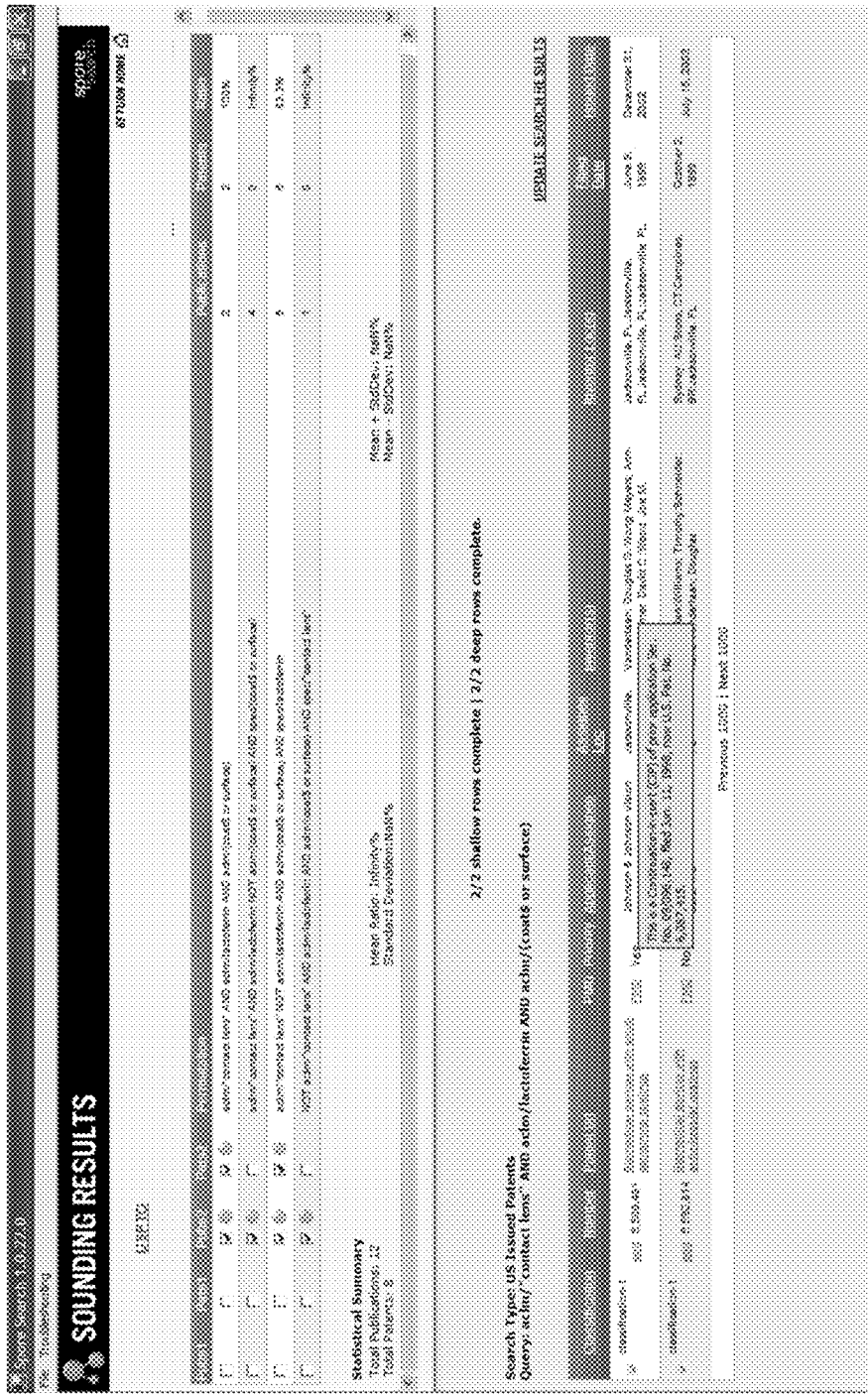
FIG. 10 is a screen view of an automated system according to the present invention.

The spreadsheet layout, as shown in FIGS. 9 and 10, preferably has separate sheets for each query result; each sheet preferably having at least one column for predetermined database fields and rows for the records retrieved. This format allows for the rapid review of records. This layout also allows for sorting the array by columns, such that reviewer can prioritize records according to one or more of the database fields.

The results displays also preferably incorporate information in mouse-over, or hover, pop-ups. These can be data which are too large to be reasonably displayed on the spreadsheet, but are immediately desirable to be viewed once the viewer would like to examine a record in more detail.

For example, the abstract can be inserted in a rollover box in the title and the priority cross-reference data can be inserted in a rollover box in the CIP status (YES/NO), as shown in FIGS. 9 and 10, respectively. The claims can also be extracted from the patent and shown in a rollover box. For example, the first independent claim can be inserted into the rollover box when the user hovers over a button that hyperlinks to or launches a patent matrix diagram of the patent, shown as "PMD" in FIGS. 9 and 10. The presentation of the first independent claim allows the user to rapidly screen grants/applications for relevance by minimizing click-through to other pages and thereby staying on the same page view.

6. Classification, Notes.

The user can then select and/or flag documents based on their examination criteria. For example, as shown in FIG. 11, the user interface contains 3 columns named "102", "103", and "Cited/NRO". These denominations are used for patent examination by the patent office to classify prior art references as providing anticipation (102) or obviousness (103) or "cited but not relied upon" to an application under examination.

The Tree diagram layout according to another embodiment of the present invention The tree diagram layout displays all of the results from the mapping in a single diagram. This format allows for an overview of the field and conveys a sense of the density of the prior art. The tree diagrams can be rooted or unrooted.

Figure 12:
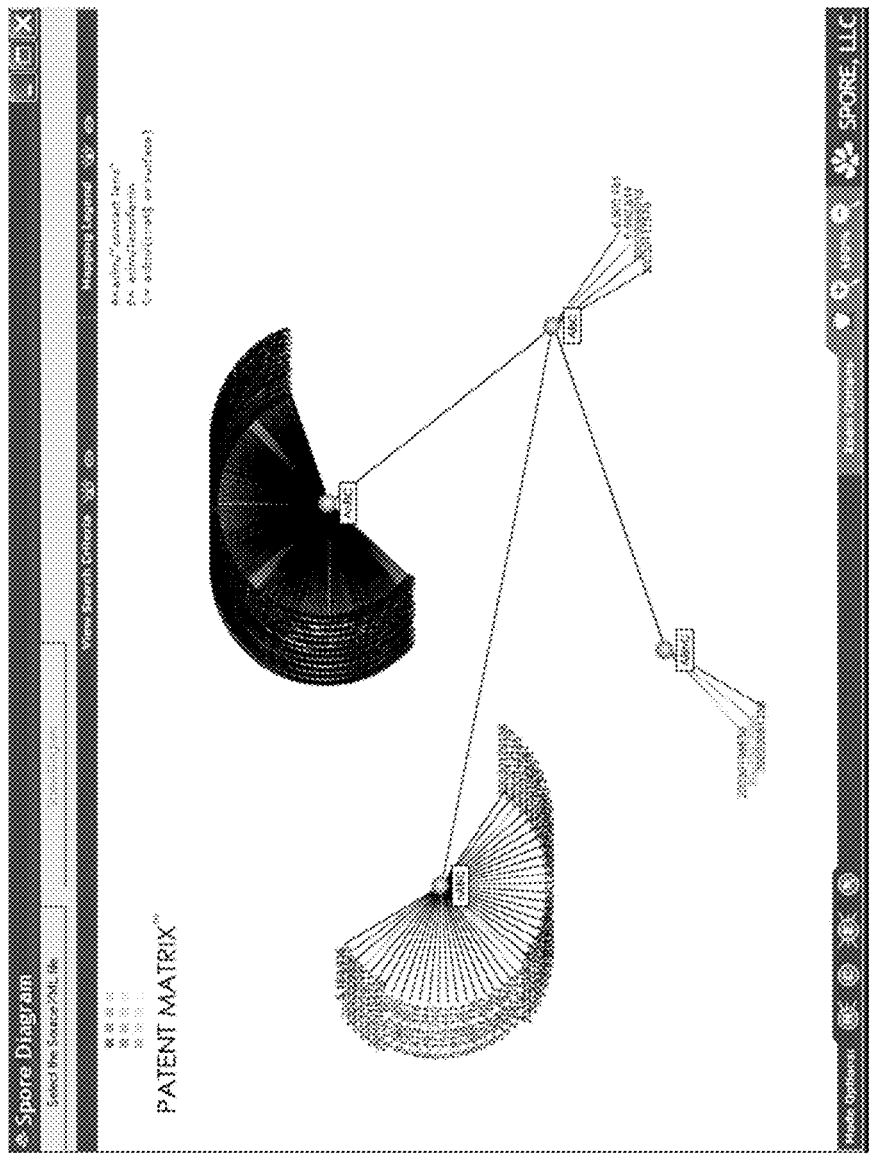
FIG. 12 is a screen view of an automated system according to the present invention.
Figure 13:
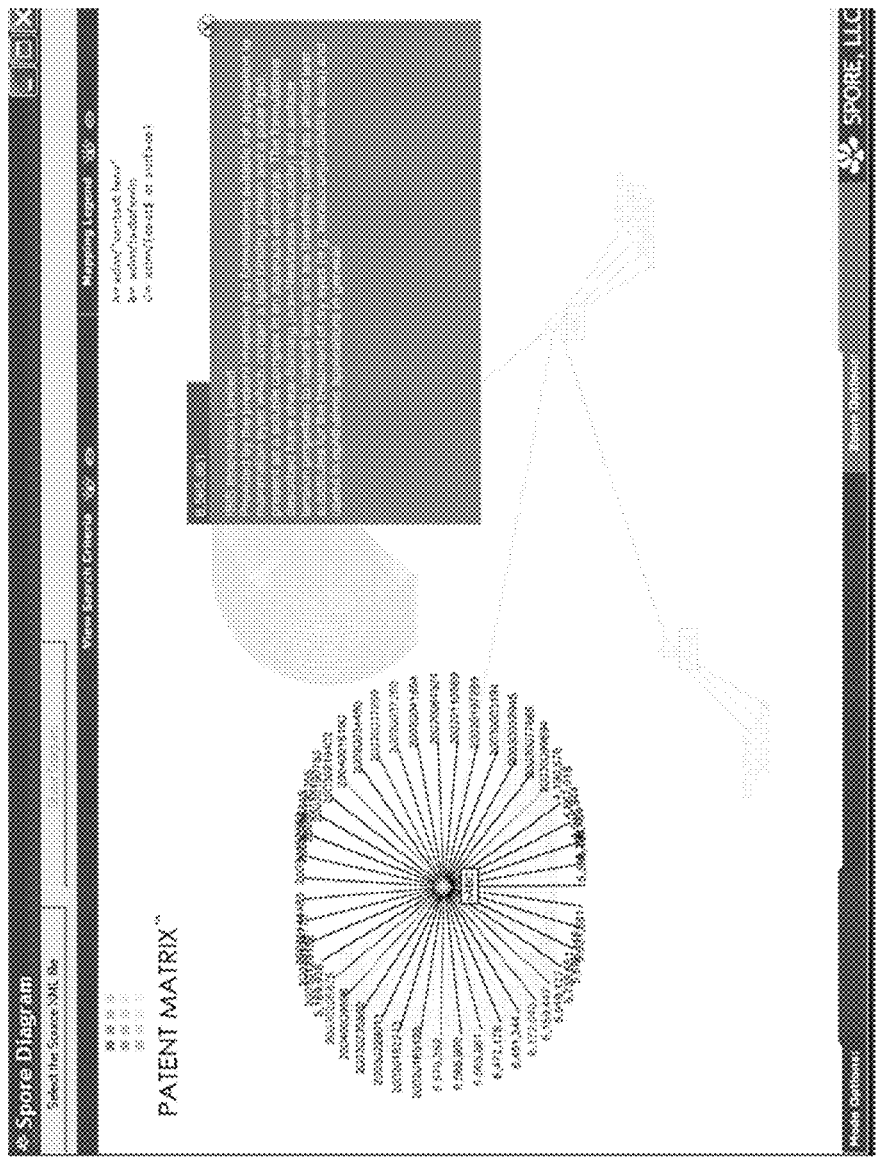
FIG. 13 is a screen view of an automated system according to the present invention.

The prior described search was rerun limiting the components to the claims database field to reduce the number of records for display purposes. The results were mapped in an unrooted tree diagram, shown in FIG. 12. Shown are the four groups—the niche and immediately adjacent neighborhoods. Each of the records is displayed in the group; the label for each record at the end of a spoke radiating from hub. In this view the patents and pregrant publications are grouped in a single hub. The resolution of each hub can be increased by expanding the hub, as shown in FIG. 13. In FIG. 13, the pointer is also hovering over content item or U.S. Pat. No. 6,565,861 and relevant patent information, as previously discussed herein, is displayed in a pop-up window. Notes and other information added during examination can also be displayed, as shown for this record.

7. Preprogrammed Searches

Niche and Neighborhood Search

The simplest search is a "niche-and-neighborhood" search, shown previously. In this search, each component is "excluded" from the search string using the ANDNOT boolean operator. This use of the ANDNOT also prevents redundancy in the search results. Simply omitting a component, a component omission exclusion, would results in the inventions that have all the components (ALL group) showing up again in all the neighborhoods.

Teaching Specification Search

A teaching specification search is designed to assist in quickly screening patents for obviousness. Obviousness here refers to the criteria used by the Patent Offices.

In a Teaching specification search, the components are inputted into the search screen as before, and the components are automatically delimited to the claims field. The software automatically generates the specific neighborhood search strings, which are designed to exclude the patents with the component in the claims, but include patents with the component in the specification. These strings are shown in the "Permutation" column in FIG. 14. An example string for a neighborhood is:

aclm/"contact lens" AND aclm/lactoferrin NOT aclm/ (coat$ or surface) AND spec/(coat$ or surface).

In this string/neighborhood, grants/applications with coat$ or surface in the claims are excluded, while grants/applications with coat$ or surface not in the claims but in the specification are included.

Note that the permutation are similar to the Niche/Neighborhood search, except that when a component is removed (ANDNOT) from the search in the claims field (aclm/ . . . ); it is added to the search in the specification field (spec/ . . . ). These groups of patents are ones that do not specifically claim the component, but do teach the component in some way in the specification. Therefore, it may be obvious to add this taught component to the prior art and create a new invention.

Figure 14:
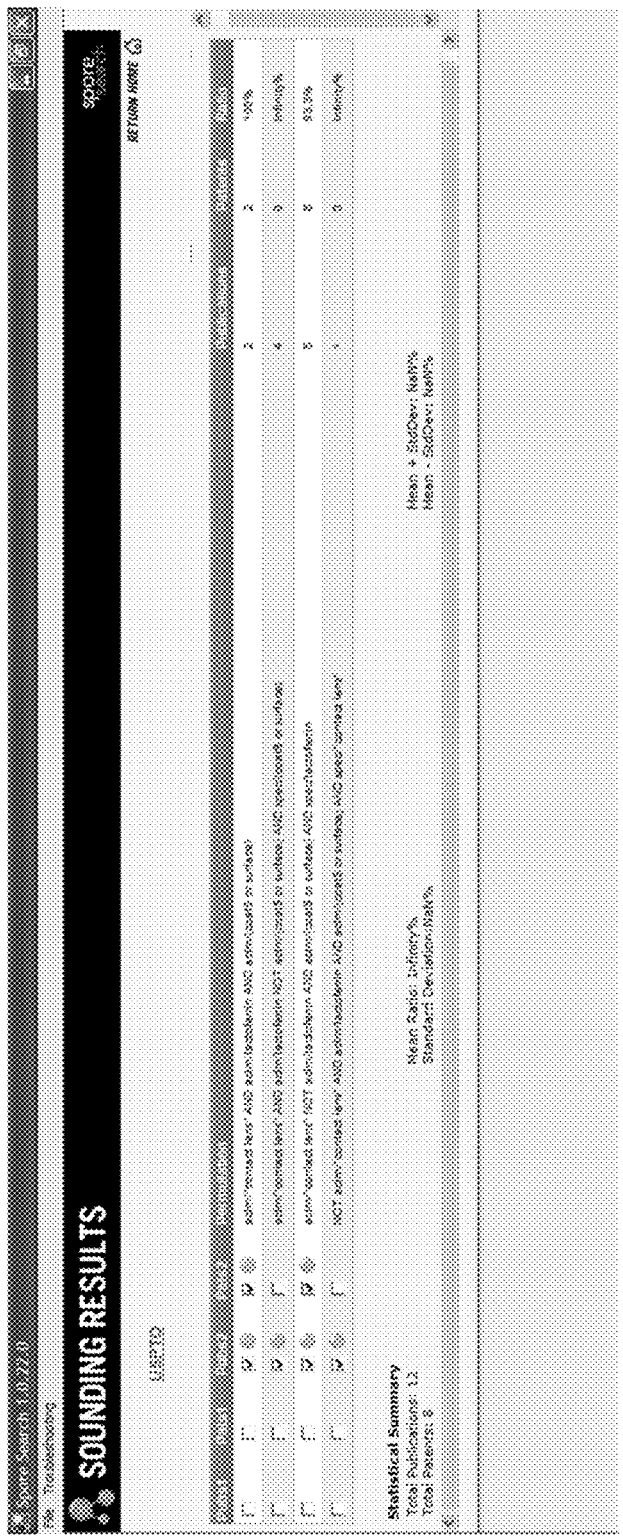
FIG. 14 is a screen view of an automated system according to the present invention.

Note the reduced number of patents in the neighborhoods with respect to the search shown in FIG. 14. This reduction in number reduces the workload for a user examining an invention for obviousness or anticipation if a quick elimination can be made based on anticipation or obviousness.

The teaching search advantageously provides a precise and comprehensive search of a database for a target based upon the components used to create the target. Also advantageously, this method for searching provides for an accurate, streamlined manner for searching large databases including records or files with detailed, confidential or functional fields that can be singled out as teaching search elements. The records returned by a teaching search are almost always relevant because all records include all the elements defining the target group.

A teaching specification search can be adapted to perform similar types of searches using record fields other than the claims field and/or specification field in patent databases or other databases. In the teaching specification search, the claims field are termed the first field and the specification field, the second field. For example, a searcher may desire to search the abstract, rather than the claims, as the first field and the specification as the second field. Such a search can be useful for certain technology fields, for example, chemical compositions of matter or genetic sequences, wherein the claims do not necessarily describe the invention in text or words.

The same method of searching a first field then a second field upon exclusion of the first, can also be applied to databases in which records are divided into searchable fields. Preferably, databases having records divided in the searchable fields include tagged fields. By way of example, XML-tagged fields can be searched using the present invention. For example, queries of news articles can search the abstract as the first field, then the body as the second field, upon exclusion of the abstract from the query string. Another example is searching of medical databases, wherein the record fields include current medication and past medication. A query could be formulated wherein the records are searched for current prescription medication as the first field and past prescription medication as the second field. Other examples include technology documents, such as technical articles, research papers, funding or grant applications, technical specifications for products, systems and/or software, human resources data, As these examples illustrate, the teaching specification type search can be adapted to assist in the query of many types of databases, including searches wherein the target is not an invention. In cases where the target is not an invention, the searcher still deconstructs the target into key components.

Combinatorial Searches

Combinatorial searches are designed to break a technology field into multiple niches based on key components or technologies. They are an extension of the Niche/Neighborhood searches. For example, if the key components to be examined were a) contact lens b) lactoferrin and c) coating, the possible unique combinatorial searches would be 7, as shown in Table 6.

TABLE 6

Unique combinatorial search strings for 3 components.

| Search # | Search strings |
|---|---|
| 1 (ALL) | a AND b AND c |
| 2 | a AND b ANDNOT c |
| 3 | a ANDNOT b AND c |
| 4 | b AND c ANDNOT a |
| 5 | a ANDNOT b ANDNOT c |
| 6 | b ANDNOT c ANDNOT a |
| 7 | c ANDNOT b ANDNOT a |

For 3 components there are 7 combinatorial search strings. For 4 components there are 15 possible unique strings and for 5 components there are 31 possible unique strings. The results are mapped for visual display. A combinatorial search can be exhaustive, that is, every unique combination is submitted. This analysis is called an Exhaustive Combinatorial Search.

Sometimes the search strings with only a single component return a large number of meaningless hits. For example, searches 5, 6, and 7 in Table 6 may produce a large number of hits that are too burdensome and have too little meaning to be examined by the user. In these cases, a Proximal Combinatorial Search is used. This search generates strings only out to double component strings. That is, the strings with only a single component, such as strings 5, 6, and 7 above, are not generated. In the case of a 3-component system, the number of search strings is the same as for a Niche/Neighborhood analysis. For a 4-component system, however, there will be 11 strings for a Proximal Combinatorial search, versus 5 for a Niche/Neighborhood analysis and 15 for an Exhaustive Combinatorial Search. For a 5 components system, the Proximal Combinatorial Search will generate 26 search strings versus 6 for a Niche/Neighborhood analysis. Table 7 illustrates the different number of groups generated by each search for a given number of components.

TABLE 7

| Components | Niche/Neighborhood OR Teaching specification search | Proximal Combinatorial | Exhaustive Combinatorial |
|---|---|---|---|
| 3 | 4 | 4 | 7 |
| 4 | 5 | 11 | 15 |
| 5 | 6 | 26 | 31 |
| 6 | 7 | 57 | 63 |
| 7 | 8 | 120 | 127 |

Set Subtraction

Differential combinations of these searches can also be performed. For example, the user can perform a Niche-and-Neighborhood minus a Teaching specification search or vice-versus, or a Combinatorial search minus a Niche-and-Neighborhood or Teaching specification search. The ability to subtract the results of one search from another allows the user to progress through the search types with the same components without having to re-review records already reviewed in a previous search.

Trends Analysis

A system according to the present inventions also provides analyses of trends in the searched technology fields. These trends analyses, also called growth, flux or invention rate analyses, include analyses such as the Publication/ patent ratio; Publication and/or patent trend, such as Publications/unit time, Date difference between neighboring publications; Art unit or examination density or latency, such as Filing-to-issuance time period, Issuance/Publication ratio; Technology field analyses, such as Emigration/Immigration of assignees/inventors, Technology field lifecycle analyses; and Date-based analyses, such as patent flux and parsing into time intervals.

Growth analyses, which may also be termed flux analyses or invention rate, are metrics used to determine the absolute and relative rate of new patent applications in a particular area, such as a niche, neighborhood, classification or similar area.

A preferred growth analysis is the publication/patent ratio, shown in the "Ratio" column in FIGS. 8 and 9. In this analysis, the number of publication for a defined area is divided by the number of issued patents for the area to give the ratio. The number can be converted to a percentage, if desired. This ratio is an indication of the growth, since an area only grows by submission of new applications.

Another type of growth analysis is the applications and/or patent trend analysis, which is the number of applications or patents/unit time. This metric can be displayed as an absolute number, polynomial function to show change, or as a graph.

Another patent trend analysis is the date difference between neighboring publications. This computation shows activity peaks and trends. For example, if this metric is decreasing with time, then patent applications are increasing in the analyzed area.

Examination latency analysis is another useful metric. This analysis is performed for an area by calculating the filing-to-issuance time period for patents in the area, the reasoning being that more mature technology areas will require longer prosecution prior to issuance and therefore will have a longer filing-to-issuance period. The issuance/publication ratio can be used as a similar metric. This analysis is performed by dividing the patents issued in a time period by the patent applications in a time period. The time periods can be the same, or can be different. For example, if the earliest and latest filing dates for the issued patents in the patent time period is known, the applications time period can be the time period between the two filing dates.

Another indicator of the growth and/or maturity status of an area is the emigration/immigration of assignees and/or inventors into and out of the area.

Date-based growth analyses may also be performed. For example, the distance between neighboring grants/applications can be computed, for example based on the filing date. Alternatively or additionally, for patent systems with serially numbered patents, the difference between patent numbers may be used. The grants/applications may also be parsed into time intervals, and graphed or converted to a polynomial to demonstrate growth.

Figure 15:
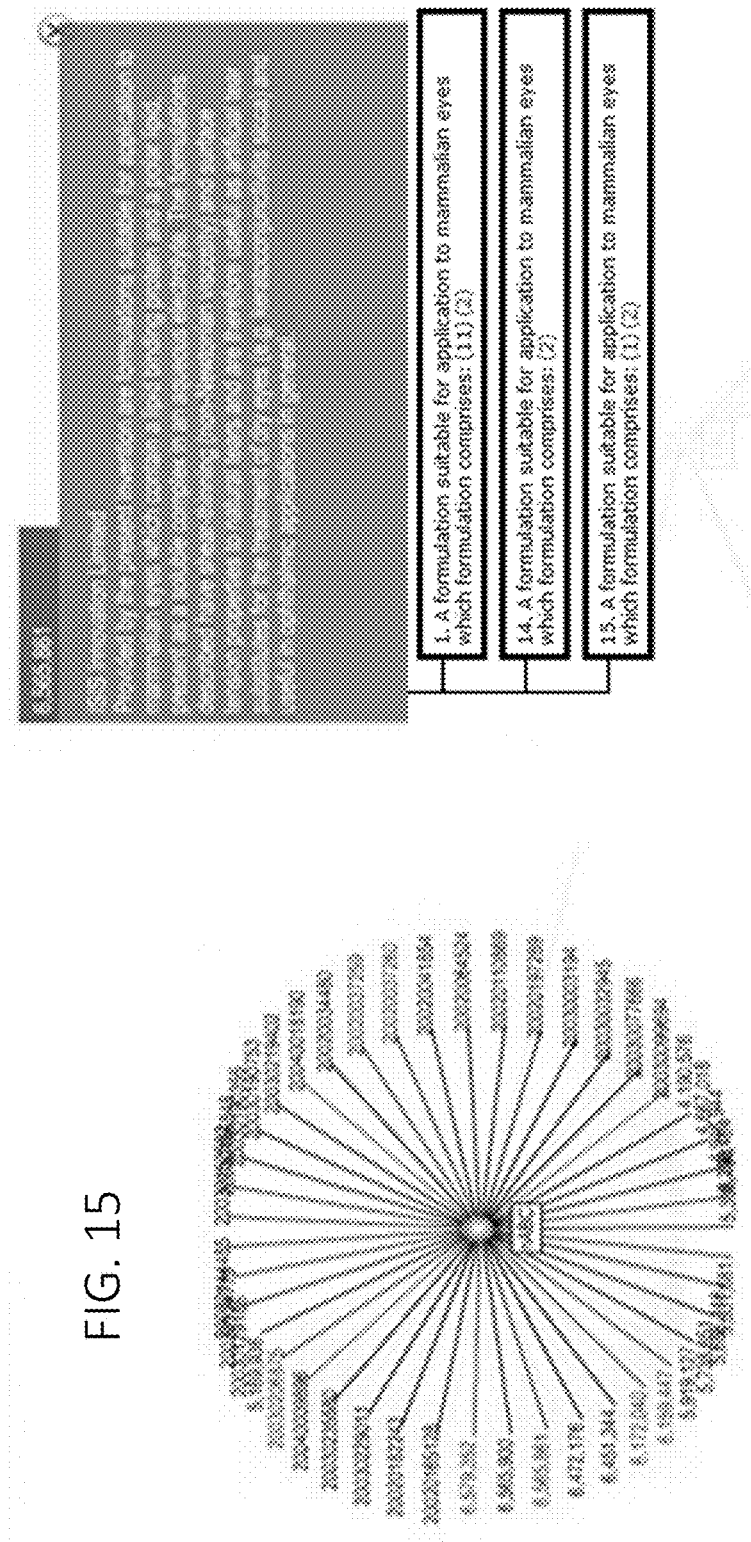
FIG. 15 is a user interface of a search hub with selected content abstract and claims diagram.
Figure 16:
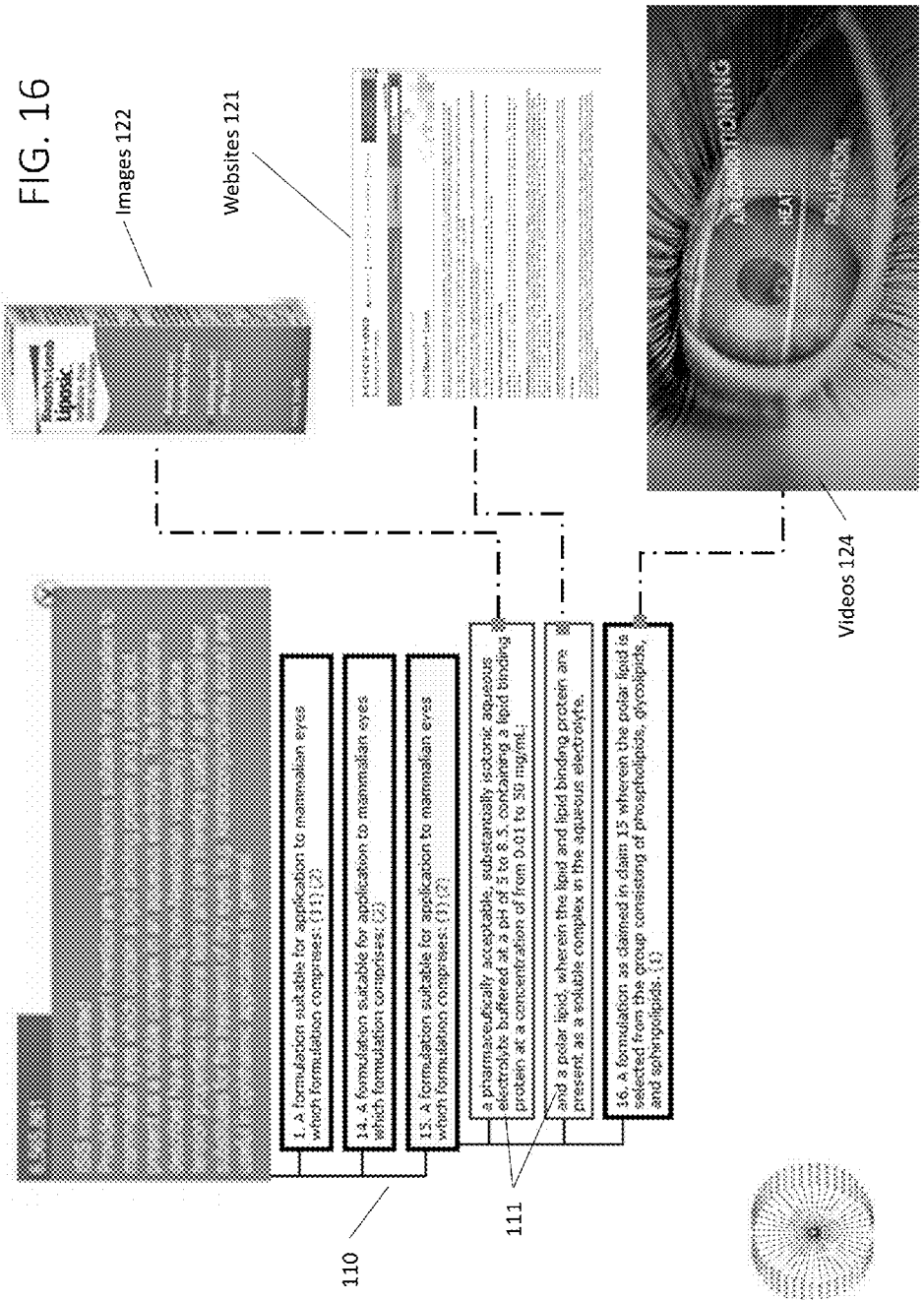
FIG. 16 is the user interface of FIG. 15 with relevant technology content thumbnail images.

The present invention further provides for real-time, automated display of claims when a content item is selected. FIG. 15 illustrates an embodiment of this feature, which is an interface, generally described as 100, showing the hub 101 from FIG. 13, the abstract 102 from the selected patent on the hub (U.S. Pat. No. 6,565,861), and the compressed patent claims hierarchy 110 for that patent. The compressed patent claims show the preambles for the independent claims. Thus, the invention provides for the automated import of patent claims, automated parsing of the claims into their hierarchy, and compression/expansion functionality of the parsed claims to/from the independent claim level. The independent claims can be expanded to show the claims limitations and dependent claims (FIG. 16).

The present invention further provides for real-time, automated analysis of claims to assist in determining infringement by competitors in real-time or near-real-time. An interface provides a patent claims diagram as previously described with additional content of potential patent claims infringers shown diagrammatically connected to the claims elements and sub-elements. FIG. 16 illustrates an embodiment of this feature, showing a user interface, generally described as 100, with sub-elements 111 of the patent claims diagram 110 linked to matching technology content thumbnail images 120. The content is selected from at least one form of media, by way of example and not limitation, websites 121, images 122, videos 124, documents (PDF, Word), product specifications, user manuals, advertisements, marketing collateral, competitive product comparisons and the like. The hub is minimized to allow space for the content.

The present invention analyzes the elements or sub-elements and then searches in real-time for matching technology content. Once content is located, a semantics engine analyzes in real-time the meaning of the content to determine if it qualifies as matching technology content. Once it is determined to be matching technology content, the semantics engine determines in real-time if the purpose of the content meets the requirements of the study. By way of example and not limitation, the semantics engine would analyze the content and its context to determine if the content was an offer to sell, which would qualify as matching technology content, or a technology review article, which would not qualify.

Figure 17:
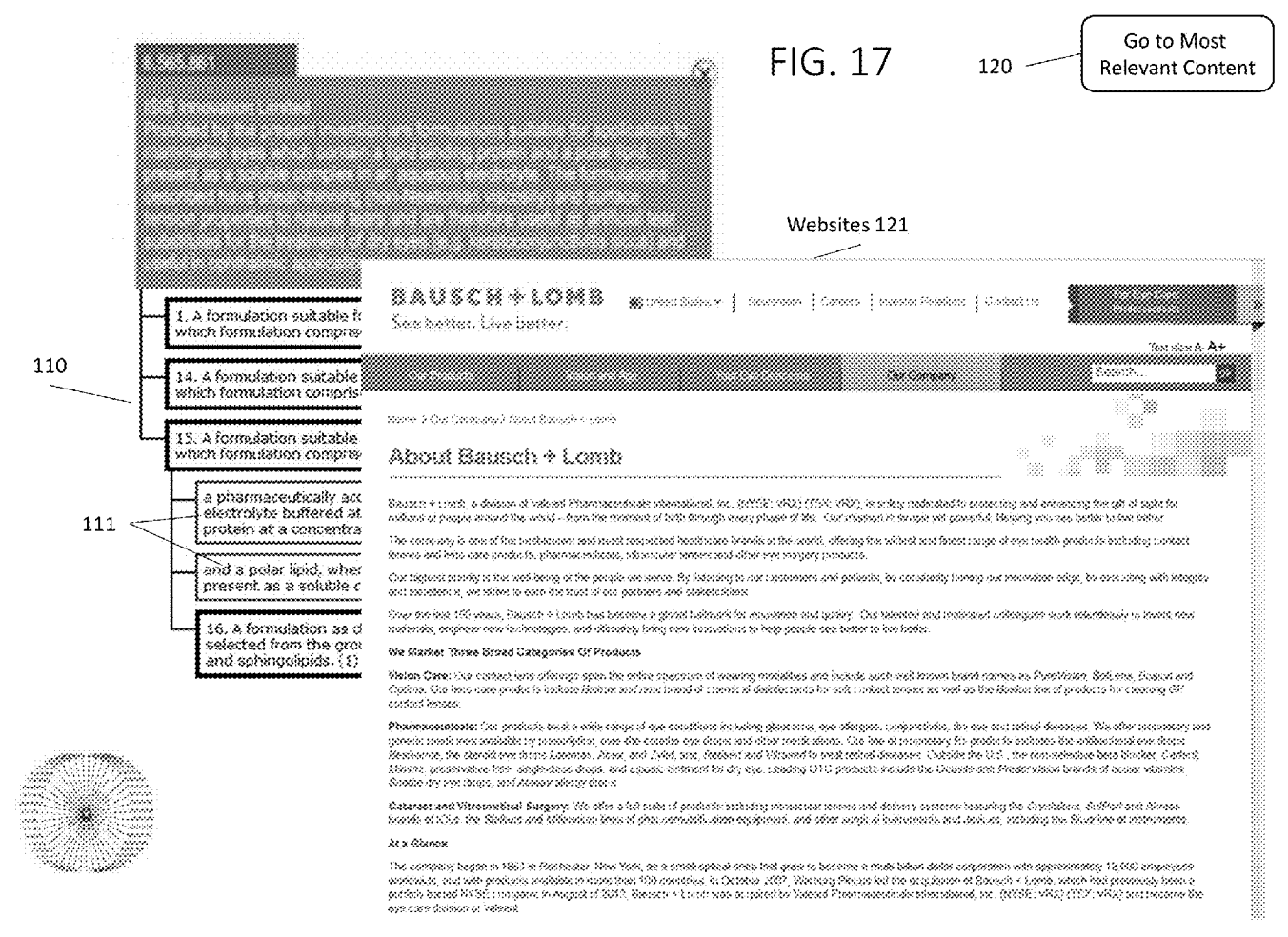

Selecting a matching technology content thumbnail image brings the content to the foreground and expands it to fill the interface, to fill a predetermined pane in the interface, or to a predetermined size (FIG. 17). Preferably, the expanded content does not obscure the parent linked key component. This method of presenting content is much more memorable that the prior art methods, an example of which is shown in FIG. 18. Here the various claims elements, represented as 201, 202, 203, etc. and the various potential infringers, represented as 301-306, are arranged in a table to form a matrix. If matching technology content is found, then a notation (X) is made in the table at the appropriate cell.

A method according to the present invention (FIG. 19) includes the steps of 1) receiving a patent number or other means of identification, 2) importing the patent claims, 3) parsing the claims and displaying them diagrammatically, 4) receive sub-element selections, 5) analyzing the selected sub-elements to determine keywords, 6) searching a database for matching technology content using the keywords, 7) retrieving matching technology content, 8) analyzing the retrieved content to determine if the record is relevant to the purpose of the study, 9) if relevant, displaying the matching technology content thumbnail images beside the patent claims diagram and linking the thumbnail images to the appropriate sub-element(s), and 10) periodically updating the search results for matching relevant content. If the retrieved record is not relevant, then the record is discarded. Additional steps include receiving edits and annotations to the diagram components.

Note that the same content can satisfy the criteria for more than one sub-element, and therefore be linked to multiple sub-elements. In these cases, the system links a sub-element to the location in the document that is most relevant, based on semantic analysis of the sub-element.

In another embodiment, the system includes a "Go To Most Relevant Content" link, which appears upon the first expansion of a thumbnail (FIG. 17); clicking on this button brings up the most relevant content location for the linked sub-element.

In yet another embodiment, references to relevant sections of the specification of the patent or application are linked to each element or sub-element in a patent claims diagram. The relevant sections of the specification are preferably represented as paragraph numbers or column and line numbers. In one embodiment, the images and websites are located to the right of each element or sub-element and the relevant sections of the specification are located to the left of each element or sub-element. The paragraph numbers or column and line numbers are preferably included in a box, circle, or any other polygon. User activation of a paragraph number, column and line number, or the polygon associated with the paragraph number or column and line number causes the relevant specification text to be displayed in the diagram. The relevant specification text is displayed by itself a popup window or in context within the document (via a link to the USPTO, Google Patents, or on a local drive). The popup window fills a predetermined pane in the interface or expands to a predetermined size. Key words and/or key phrases are preferably highlighted in the relevant specification text. Determination of the relevant specification text is performed via an algorithm and/or user input. The algorithm searches the specification for key words and/or searches the prosecution history files for cited specification support by the applicant. The key words are determined by the words in the claim element or sub-element and/or related words to the words in the claim element or sub-element which are input by the user or from a database of words with their relations to other words.

FIG. 20 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with a computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 20, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 20, may include other components that are not explicitly shown in FIG. 20, or may utilize an architecture completely different than that shown in FIG. 20. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention is necessarily rooted in computer technology in order to overcome a problem specifically arising in the realm of computer networks. More specifically, the present invention electronically searches and parses, in real-time, millions of websites, documents, images and videos from around the planet to find the ones that are relevant. This immense amount of content, which cannot be parsed in real-time or near-real-time by humans, was not available prior to the advent of the Internet. Prior to the Internet, litigators would have to deal with hundreds or maybe thousands of documents per case, which required a large amount of time. Now, with the availability of millions of articles of content, there are not enough persons trained in litigation to review all the content in real-time or near-real-time. Thus, this is a problem created by the Internet.

Additionally, the majority of these documents are only offered electronically and only through the Internet. Thus, it is not possible for users to search these documents except by using computer and electronic networking technology, including GUIs.

The GUIs described in the present invention are also a product of computer technology and Internet connectivity, and as such were unavailable before the Internet. Specifically, the hierarchical claims diagram displays and the expansion mechanisms which are operable to expand dependent claims and dependent claim text were not available before computing technology and the Internet.

Additionally, the present method differs from prior art manual methods. Specifically, the present method first searches for technology keywords, and then determines if the document is relevant to the purpose of the study. In prior art manual methods, the searcher would first determine if a document was relevant to the purpose of the study, and then determine if the technology content in the document was relevant.

Furthermore, the high-throughput, real-time screening necessitated by the enormous number of documents along with the constraints of computer displays requires technological features that did not exist before the Internet. Specifically, the need to review multiple electronic documents in real-time within a fixed monitor requires an interactive method that can toggle rapidly between documents. The GUIs described in the present invention provides this ability.

Certain modifications and improvements will occur to those skilled in the art upon a reading of the foregoing description. By way of example, the diagrams may be produced in a variety of forms and formats without departing from the scope of the present invention. Also, the software used to generate the diagrams may vary widely; any examples provided herein are for the purpose of illustrating the present invention using commercially available software. Additionally, the methods and systems of the present invention may apply to searching and analysis of various types of content in databases. All modifications and improvements have been deleted herein for the sake of conciseness and readability but are properly within the scope of the following claims.

What is claimed is:

1. A method of analyzing inventions, comprising the steps of:
providing a system, the system comprising a server in electronic communication with at least one database;
at least one client device with a graphical user interface and software;
the server and the at least one client device in communication over an electronic network;
the server or the at least one client device running software performing the following steps:
deconstructing at least one invention into its corresponding key components;
formulating a first database query that searches for at least one of the key components in the at least one database and at least one additional related database query that excludes at least one component from the at least one database;
submitting the first database query and the at least one additional related database query to search the at least one database;
retrieving results from the first database query and the at least one additional related database query;
displaying the results as an unrooted tree in the graphical user interface of the at least one client device;
receiving a user selection of a result in one of the results;
importing patent claims of the result based upon user inputted information;
parsing the imported patent claims hierarchically;
generating a hierarchical claims diagram comprising textual claim content associated with each patent claim of the parsed patent claims, and
outputting the hierarchical claims diagram, wherein, for each patent claim of the parsed patent claims, the hierarchical claims diagram shows each patent claim in an interactive format that is operable to dynamically expand and compress the textual claim content, according to the hierarchy of the parsed patent claims;
receiving sub-element selections of the textual claim content;
analyzing the sub-element selections for technology content;
searching the at least one database for matching technology content;
retrieving the matching technology content;
receiving a study purpose;
analyzing the matching technology content to identify a record of the matching technology content that is relevant to the study purpose;
retrieving matching technology content thumbnail images associated with the record;
displaying, in the hierarchical claims diagram, the matching technology content thumbnail images next to the sub-element selections; and
linking each thumbnail image of the matching technology content thumbnail images to a corresponding sub-element of the sub-element selections;
thereby providing a method for automatically analyzing inventions.

2. The method of claim 1, further including a step of analyzing the results using cladistics.

3. The method of claim 1, further including a step of expanding hub spokes to facilitate examination.

4. The method of claim 1, further including automated search string generation.

5. The method of claim 1, further including automated query submission.

6. The method of claim 1, wherein the at least one database is a distributed database.

7. A system for analyzing inventions, comprising:
a server in electronic communication with at least one database;
at least one client device with a graphical user interface and software;
the server and the at least one client device in communication over an electronic network;
the server and/or the at least one client device comprising one or more processors and memory, wherein the one or more processors and memory execute software performing the following steps:
deconstructing at least one invention into its corresponding key components;
formulating a first database query that searches for at least one of the key components in the at least one database and at least one additional related database query that excludes at least one component from the at least one database;
submitting the first database query and the at least one additional related database query to search the at least one database;
retrieving results from the first database query and the at least one additional related database query;
displaying the results as an unrooted tree in the graphical user interface of the at least one client device;
receiving a user selection of a result in one of the results;
importing patent claims of the result based upon user inputted information;
parsing the imported patent claims hierarchically;
generating a hierarchical claims diagram comprising textual claim content associated with each patent claim of the parsed patent claims, and
outputting the hierarchical claims diagram, wherein, for each patent claim of the parsed patent claims, the hierarchical claims diagram shows each patent claim in an interactive format that is operable to dynamically expand and compress the textual claim content, according to the hierarchy of the parsed patent claims;
receiving sub-element selections of the textual claim content;
analyzing the sub-element selections for technology content;
searching the at least one database for matching technology content;
retrieving the matching technology content;
receiving a study purpose;
analyzing the matching technology content to identify a record of the matching technology content that is relevant to the study purpose;
retrieving matching technology content thumbnail images associated with the record;
displaying, in the hierarchical claims diagram, the matching technology content thumbnail images next to the sub-element selections; and linking each thumbnail image of the matching technology content thumbnail images to a corresponding sub-element of the sub-element selections;

thereby providing a system for automatically analyzing inventions.

8. The system of claim 7, further including a step of analyzing the results using cladistics.

9. The system of claim 7, further including a step of expanding hub spokes to facilitate examination.

10. The system of claim 7, further including automated search string generation.

11. The system of claim 7, further including automated query submission.

12. The system of claim 7, wherein the at least one database is a distributed database.

\* \* \* \* \*